(12) United States Patent
Bopardikar et al.

(10) Patent No.: US 12,471,592 B2
(45) Date of Patent: Nov. 18, 2025

(54) CYTOPROTECTIVE COMPOSITIONS FOR SHORT-TERM CELLS STORAGE AND TRANSPORTATION WITHOUT CRYOPRESERVATION AND DEEP FREEZING

(71) Applicant: Reelabs Private Limited, Mumbai (IN)

(72) Inventors: Abhijit Bopardikar, Andheri (West) Mumbai (IN); Padma Priya Anand Baskaran, Mumbai (IN); Sunil Pophale, Mumbai (IN); Andrii Kukharchuk, Mumbai (IN); Oleksandr Kukharchuk, Mumbai (IN); Rohit Kulkarni, Andheri (West) Mumbai (IN)

(73) Assignee: REELABS PRIVATE LIMITED, Mumbai (IN)

( * ) Notice: Subject to any disclaimer, the term of this patent is extended or adjusted under 35 U.S.C. 154(b) by 306 days.

(21) Appl. No.: 17/405,735

(22) Filed: Aug. 18, 2021

(65) Prior Publication Data
US 2023/0056314 A1  Feb. 23, 2023

(51) Int. Cl.
*A01N 1/125* (2025.01)
*A01N 1/126* (2025.01)

(52) U.S. Cl.
CPC .................. *A01N 1/125* (2025.01)

(58) Field of Classification Search
CPC ............... A01N 1/0221; A01N 1/0226
See application file for complete search history.

(56) References Cited

U.S. PATENT DOCUMENTS

| | | | |
|---|---|---|---|
| 6,328,960 | B1 | 12/2001 | McIntosh et al. |
| 6,955,814 | B1 | 10/2005 | Dobson |
| 9,265,795 | B2 | 2/2016 | Hope et al. |
| 9,458,424 | B2 | 10/2016 | Comhaire et al. |
| 2002/0064768 | A1 | 5/2002 | Polyak et al. |
| 2002/0090369 | A1* | 7/2002 | Murphy .............. A01N 1/125 424/94.63 |
| 2008/0057040 | A1 | 3/2008 | Crook et al. |
| 2009/0170929 | A1 | 7/2009 | Komeda et al. |
| 2010/0291679 | A1 | 11/2010 | Edinger et al. |
| 2011/0053256 | A1 | 3/2011 | Owen et al. |
| 2014/0113274 | A1 | 4/2014 | Dutheil et al. |
| 2018/0344652 | A1 | 12/2018 | Cristina Araújo Vieira et al. |
| 2020/0332256 | A1 | 10/2020 | Rahman et al. |
| 2020/0397807 | A1* | 12/2020 | Pranesh .............. A61P 25/00 |

FOREIGN PATENT DOCUMENTS

| | | | |
|---|---|---|---|
| CN | 114377146 | * | 4/2022 |
| CN | 114377146 A | * | 4/2022 |
| WO | 1998035551 A1 | | 8/1998 |
| WO | 2014059316 A1 | | 4/2014 |

OTHER PUBLICATIONS

Demmy TL et al. Custodiol versus Plegisol: A phase 3 multicentre myocardial protection study. Int J Angiol. 2008 Fall;17(3):149-53. doi: 10.1055/s-0031-1278300. PMID: 22477420; PMCID: PMC2727762 (Year: 2008).*
Shelley, Jake. "What is Meldonium/Mildronate?" Published Jan. 4, 2017. https://www.outsideonline.com/health/training-performance/what-meldonium-mildronate/ (Year: 2017).*
Kim KM. et al. Assessment of cell viability, early apoptosis, and hematopoietic potential in umbilical cord blood units after storage. Transfusion. Aug. 2015;55(8):2017-22. doi: 10.1111/trf.13120. Epub Apr. 10, 2015. PMID: 25858170 (Year: 2015).*
Yang, J. et al. Natural zwitterionic betaine enables cells to survive ultrarapid cryopreservation. Sci Rep 6, 37458 (2016). https://doi.org/10.1038/srep37458 (Year: 2016).*
Dou M. et al. Natural cryoprotectants combinations of I-proline and trehalose for red blood cells cryopreservation. Cryobiology. Dec. 2019;91:23-29. doi: 10.1016/j.cryobiol.2019.11.002. Epub Nov. 3, 2019. PMID: 31693877 (Year: 2019).*
Dambrova M et al. Pharmacological effects of meldonium: Biochemical mechanisms and biomarkers of cardiometabolic activity. Pharmacol Res. Nov. 2016;113(Pt B):771-780. doi: 10.1016/j.phrs.2016.01.019. Epub Feb. 2, 2016. PMID: 26850121 (Year: 2016).*
Abazari A, Jomha NM, Elliott JA, McGann LE. Cryopreservation of articular cartilage. Cryobiology 2013; 66: 201-209. https://www.sciencedirect.com/science/article/pii/S0011224013001089.
Al-Fageeh MB, Smales CM. Control and regulation of the cellular responses to cold shock: The responses in yeast and mammalian systems. Biochem J 2006; 397: 247-259. https://pubmed.ncbi.nlm.nih.gov/16792527/.
Aman RR, Parks JE. Effects of cooling and rewarming on the meiotic spindle and chromosomes of in vitro-matured bovine oocytes. Biol Reprod 1994; 50: 103-110. https://pubmed.ncbi.nlm.nih.gov/8312433/.
Arakawa T, Carpenter JF, Yoshiko AK, Crowe JH. The basis of toxicity of certain cryoprotectants: A hypothesis. Cryobiology 1990; 27: 401-415. https://www.researchgate.net/publication/222851017_The_basis_for_toxicity_of_certain_cryoprotectants_A_hypothesis.
Arakawa T, Kita Y, Timasheff SN. Protein precipitation and denaturation by dimethyl sulfoxide. *Biophys Chem* 2007; 131: 62-70. https://pubmed.ncbi.nlm.nih.gov/17904724/.
Aye M, Di Giorgio C, De Mo M, Botta A, Perrin J, Courbiere B. Assessment of the genotoxicity of three cryoprotectants used for human oocyte vitrification: Dimethyl sulfoxide, ethylene glycol and propylene glycol. *Food Chem Toxicol* 2010; 48: 1905-1912. https://pubmed.ncbi.nlm.nih.gov/20433889/.

(Continued)

*Primary Examiner* — Maria G Leavitt
*Assistant Examiner* — Vyoma Shubham Tiwari
(74) *Attorney, Agent, or Firm* — The Dobrosin Law Firm, P.C.

(57) ABSTRACT

A short-term storage of stem/progenitor cells in regenerative medicine without cryopreservation and cryoprotector. The protective composition of the invention improves the quality and increases the efficiency of cell therapy by keeping stem/progenitor cells free of ultra-low temperatures (liquid nitrogen) and cryoprotectants during the period of their biosafety testing and transportation to a patient's bed.

5 Claims, 10 Drawing Sheets

(56) References Cited

OTHER PUBLICATIONS

Bakaltcheva IB, Odeyale CO, Spargo BJ. Effects of alkanols, alkanediols and glycerol on red blood cell shape and hemolysis. *Biochim Biophys Acta* 1996; 1280: 73-80. https://pubmed.ncbi.nlm.nih.gov/8634318/.

Banič B, Nipič D, Suput D, Milisav I. DMSO modulates the pathway of apoptosis triggering. *Cell Mol Biol Lett* 2011;16: 328-341. https://www.ncbi.nlm.nih.gov/pmc/articles/PMC6275930/.

Berthelot-Ricou A, Perrin J, di Giorgio C, de Meo M, Botta A, Courbiere B. Genotoxicity assessment of mouse oocytes by comet assay before vitrification and after warming with three vitrification protocols. *Fertil Steril* 2013; 100: 882-888. https://pubmed.ncbi.nlm.nih.gov/23755955/.

Bissoyi A, Nayak B, Pramanik K, Sarangi SK. Targeting cryopreservation-induced cell death: A review. *Biopreserv Biobank* 2014; 12: 23-34. https://pubmed.ncbi.nlm.nih.gov/24620767/.

Blake RD, Delcourt SG. Thermodynamic effects of formamide on DNA stability. *Nucleic Acids Res* 1996; 24: 2095-2103. https://www.ncbi.nlm.nih.gov/pmc/articles/PMC145899/.

Bourne WM, Shearer DR, Nelson LR. Human corneal endothelial tolerance to glycerol, dimethylsulfoxide, 1,2-propanediol, and 2,3-butanediol. *Cryobiology* 1994; 31: 1-9. https://pubmed.ncbi.nlm.nih.gov/8156794/.

Catchings TT, Beamer WC, Lundy L, Prough DS. Adult respiratory distress syndrome secondary to ethylene glycol ingestion. *Ann Emerg Med* 1985; 14: 594-596. https://pubmed.ncbi.nlm.nih.gov/3994087/.

Chaytor JL, Tokarew JM, Wu LK, Leclère M, Tam RY, Capicciotti CJ, Guolla L, von Moos E, Findlay CS, Allan DS, Ben RN. Inhibiting ice recrystallization and optimization of cell viability after cryopreservation. *Glycobiology* 2012; 22: 123-133. https://pubmed.ncbi.nlm.nih.gov/21852258/.

Chen SL, Tian YS. Cryopreservation of flounder (*Paralichthys olivaceus*) embryos by vitrification. *Theriogenology* 2005; 63: 1207-1219. https://pubmed.ncbi.nlm.nih.gov/15710204/.

Ciotti PM, Porcu E, Notarangelo L, Magrini O, Bazzocchi A, Venturoli S. Meiotic spindle recovery is faster in vitrification of human oocytes compared to slow freezing. *Fertil Steril* 2009; 91: 2399-2407. https://pubmed.ncbi.nlm.nih.gov/18675965/.

Clark P, Fahy GM, Karow AM., Jr. Factors influencing renal cryopreservation. II. Toxic effects of three cryoprotectants in combination with three vehicle solutions in nonfrozen rabbit cortical slices. *Cryobiology* 1984; 21: 274-284. https://pubmed.ncbi.nlm.nih.gov/6734240/.

Damien M, Luciano AA, Peluso JJ. Propanediol alters intracellular pH and developmental potential of mouse zygotes independently of volume change. *Hum Reprod* 1990; 5: 212-216. https://pubmed.ncbi.nlm.nih.gov/2324264/.

De Ménorval MA, Mir LM, Fernández ML, Reigada R. Effects of dimethyl sulfoxide in cholesterol-containing lipid membranes: A comparative study of experiments in silico and with cells. *PLoS One* 2012; 7: e41733. https://pubmed.ncbi.nlm.nih.gov/22848583/.

Elmoazzen HY, Poovadan A, Law GK, Elliott JA, McGann LE, Jomha NM. Dimethyl sulfoxide toxicity kinetics in intact articular cartilage. *Cell Tissue Bank* 2007; 8: 125-133. https://pubmed.ncbi.nlm.nih.gov/17063260/.

Eroglu A, Bailey SE, Toner M, Toth TL. Successful cryopreservation of mouse oocytes by using low concentrations of trehalose and dimethylsulfoxide. *Biol Reprod* 2009; 80: 70-78. https://www.ncbi.nlm.nih.gov/pmc/articles/PMC2804808/.

Eroglu A, Toner M, Toth TL. Beneficial effect of microinjected trehalose on the cryosurvival of human oocytes. *Fertil Steril* 2002; 77: 152-158. https://pubmed.ncbi.nlm.nih.gov/11779606/.

Fahy GM, Levy DI, Ali SE. Some emerging principles underlying the physical properties, biological actions, and utility of vitrification solutions. *Cryobiology* 1987; 24: 196-213. https://pubmed.ncbi.nlm.nih.gov/3595164/.

Fahy GM, Lilley TH, Linsdell H, Douglas MS, Meryman HT. Cryoprotectant toxicity and cryoprotectant toxicity reduction: In search of molecular mechanisms. *Cryobiology* 1990; 27: 247-268. https://pubmed.ncbi.nlm.nih.gov/2199153/.

Fahy GM, Wowk B, Wu J, Paynter S. Improved vitrification solutions based on the predictability of vitrification solution toxicity. *Cryobiology* 2004; 48: 22-35. https://pubmed.ncbi.nlm.nih.gov/14969679/.

Fahy GM, Wowk B, Wu J. Cryopreservation of complex systems: The missing link in the regenerative medicine supply chain. *Rejuvenation Res* 2006; 9: 279-291. https://pubmed.ncbi.plm.nih.gov/16706656/.

Fahy GM. Cryoprotectant toxicity neutralization. *Cryobiology* 2010; 60 (Suppl 3): S45-S53. https://pubmed.ncbi.nlm.nih.gov/19501081/.

Fahy GM. Cryoprotectant toxicity reduction: Specific or non-specific? *Cryo-Letters* 2009; 5: 287-294. https://www.sciencedirect.com/science/article/abs/pii/S0011224009000650.

Fahy GM. Cryoprotectant toxicity: Biochemical or osmotic? *Cryo-Letters* 1984; 5: 79-90. https://eurekamag.com/research/005/071/005071413.php.

Fahy GM. The relevance of cryoprotectant "toxicity" to cryobiology. *Cryobiology* 1986; 23: 1-13. https://pubmed.ncbi.nlm.nih.gov/3956226/.

Galvao J, Davis B, Tilley M, Normando E, Duchen MR, Cordeiro MF. Unexpected low-dose toxicity of the universal solvent DMSO. *FASEB J* 2014; 28: 1317-1330. https://pubmed.ncbi.nlm.nih.gov/24327606/.

Gardner DK, Sheehan CB, Rienzi L, Katz-Jaffe M, Larman MG. Analysis of oocyte physiology to improve cryopreservation procedures. *Theriogenology* 2007; 67: 64-72. https://www.sciencedirect.com/science/article/abs/pii/S0093691X0600505X.

Gardner TB, Manning HL, Beelen AP, Cimis RJ, Cates JM, Lewis LD. Ethylene glycol toxicity associated with ischemia, perforation, and colonic oxalate crystal deposition. *J Clin Gastroenterol* 2004; 38: 435-439. https://pubmed.ncbi.nlm.nih.gov/15100524/.

Gautam SK, Verma V, Palta P, Chauhan MS, Manik RS. Effect of type of cryoprotectant on morphology and developmental competence of in vitro-matured buffalo (*Bubalus bubalis*) oocytes subjected to slow freezing or vitrification. *Reprod Fertil Dev* 2008; 20: 490-496. https://pubmed.ncbi.nlm.nih.gov/18462611/.

Gupta MK, Uhm SJ, Lee HT. Effect of vitrification and beta-mercaptoethanol on reactive oxygen species activity and in vitro development of oocytes vitrified before or after in vitro fertilization. *Fertil Steril* 2010; 93: 2602-2607. https://pubmed.ncbi.nlm.nih.gov/20303480/.

Gurtovenko AA, Anwar J. Modulating the structure and properties of cell membranes: The molecular mechanism of action of dimethyl sulfoxide. *J Phys Chem B* 2007; 6; 111: 10453-10460. https://pubmed.ncbi.nlm.nih.gov/17661513/.

Hakura A, Mochida H, Yamatsu K. Dimethyl sulfoxide (DMSO) is mutagenic for bacterial mutagenicity tester strains. *Mutat Res* 1993; 303: 127-133. https://pubmed.ncbi.nlm.nih.gov/7694129/.

Hanslick JL, Lau K, Noguchi KK, Olney JW, Zorumski CF, Mennerick S, Farber NB. Dimethyl sulfoxide (DMSO) produces widespread apoptosis in the developing central nervous system. *Neurobiol Dis* 2009; 34: 1-10. https://pubmed.ncbi.nlm.nih.gov/19100327/.

Hess R, Bartels MJ, Pottenger LH. Ethylene glycol: An estimate of tolerable levels of exposure based on a review of animal and human data. *Arch Toxicol* 2004; 78: 671-680. https://pubmed.ncbi.nlm.nih.gov/15372138/.

Homsi E, Janino P, de Faria JB. Role of caspases on cell death, inflammation, and cell cycle in glycerol-induced acute renal failure. *Kidney Int* 2006; 69: 1385-1392. https://pubmed.ncbi.nlm.nih.gov/16557226/.

Ivanov IT. Rapid method for comparing the cytotoxicity of organic solvents and their ability to destabilize proteins of the erythrocyte membrane. *Pharmazie* 2001; 56: 808-809. (Abstract Only) https://pubmed.ncbi.nlm.nih.gov/11683129/.

(56) References Cited

OTHER PUBLICATIONS

Jomha NM, Law GK, Abazari A, Rekieh K, Elliott JA, McGann LE. Permeation of several cryoprotectant agents into porcine articular cartilage. *Cryobiology* 2009; 58: 110-114. https://pubmed.ncbi.nlm.nih.gov/19041639/.
Jomha NM, Weiss AD, Fraser Forbes J, Law GK, Elliott JA, McGann LE. Cryoprotectant agent toxicity in porcine articular chondrocytes. *Cryobiology* 2010; 61: 297-302. https://pubmed.ncbi.nlm.nih.gov/20940008/.
Korrapati MC, Shaner BE, Schnellmann RG. Recovery from glycerol-induced acute kidney injury is accelerated by suramin. *J Pharmacol Exp Ther* 2012; 341: 126-136. https://europepmc.org/article/med/22228809.
Larman MG, Sheehan CB, Gardner DK. Calcium-free vitrification reduces cryoprotectant-induced zona pellucida hardening and increases fertilization rates in mouse oocytes. *Reproduction* 2006; 131: 53-61. https://pubmed.ncbi.nlm.nih.gov/16388009/.
Lawson A, Ahmad H, Sambanis A. Cytotoxicity effects of cryoprotectants as single-component and cocktail vitrification solutions. *Cryobiology* 2011; 62: 115-122. https://www.ncbi.nlm.nih.gov/pmc/articles/PMC3049861/.
Liu J, Yoshikawa H, Nakajima Y, Tasaka K. Involvement of mitochondrial permeability transition and caspase-9 activation in dimethyl sulfoxide-induced apoptosis of EL-4 lymphoma cells. *Int Immunopharmacol* 2001; 1: 63-74. https://pubmed.ncbi.nlm.nih.gov/11367518/.
Lubzens E, Tamar G, Pekarsky I, Blais I, Chapovetsky V, Admon A. Proteomic analysis on the effect of cryopreservation procedures on fish oocytes (abstract 73). *Cryobiology* 2006; 53: 398-399. https://www.ncbi.nlm.nih.gov/pmc/articles/PMC4620521/.
Macías García B, Ortega Ferrusola C, Aparicio IM, Miró-Morán A, Morillo Rodriguez A, Gallardo Bolaños JM, González Fernández L, Balao da Silva CM, Rodríguez Martínez H, Tapia JA, Peña FJ. Toxicity of glycerol for the stallion spermatozoa: Effects on membrane integrity and cytoskeleton, lipid peroxidation and mitochondrial membrane potential. *Theriogenology* 2012; 77: 1280-1289. https://pubmed.ncbi.nlm.nih.gov/22326587/.
Markarian SA, Bonora S, Bagramyan KA, Arakelyan VB. Glass-forming property of the system diethyl sulphoxide/water and its cryoprotective action on *Escherichia coli* survival. *Cryobiology* 2004; 49: 1-9. Mehl P, Boutron P. Cryoprotection of red blood cells by 1,3-butanediol and 2,3-butanediol. *Cryobiology* 1988; 25: 44-54. https://pubmed.ncbi.nlm.nih.gov/15265712/.
Meryman HT. Cryopreservation of living cells: Principles and practice. *Transfusion* 2007; 47: 935-945. https://pubmed.ncbi.nlm.nih.gov/17465961/.
Mitrus I, Smagur A, Giebel S, Gliwinska J, Prokop, Glowala-Kosinska M, Chwieduk A, Sadus-Wojciechowska M, Tukiendorf A, Holowiecki J. A faster reconstitution of hematopoiesis after autologous transplantation of hematopoietic cells cryopreserved in 7.5% dimethyl sulfoxide if compared to 10% dimethyl sulfoxide containing medium. *Cryobiology* 2013; 67: 327-331. https://pubmed.ncbi.nlm.nih.gov/24125911/.
Morley P, Whitfield JF. The differentiation inducer, dimethyl sulfoxide, transiently increases the intracellular calcium ion concentration in various cell types. *J Cell Physiol* 1993; 156: 219-225. https://pubmed.ncbi.nlm.nih.gov/8393876/.
Mullen SF, Li M, Li Y, Chen ZJ, Critser JK. Human oocyte vitrification: The permeability of metaphase II oocytes to water and ethylene glycol and the appliance toward vitrification. *Fertil Steril* 2008; 89: 1812-1825. https://www.ncbi.nlm.nih.gov/pmc/articles/PMC2494737/.
Neild DM, Brouwers JF, Colenbrander B, Agüero A, Gadella BM. Lipid peroxide formation in relation to membrane stability of fresh and frozen thawed stallion spermatozoa. *Mol Reprod Dev* 2005; 72: 230-238. https://pubmed.ncbi.nlm.nih.gov/15948163/.
Neutelings T, Lambert CA, Nusgens BV, Colige AC. Effects of mild cold shock (25° C.) followed by warming up at 37° C. on the cellular stress response. *PLoS One* 2013; 8: e69687. https://journals.plos.org/plosone/article?id=10.1371/journal.pone.0069687.
Notman R, den Otter WK, Noro MG, Briels WJ, Anwar J. The permeability enhancing mechanism of DMSO in ceramide bilayers simulated by molecular dynamics. *Biophys J* 2007; 93: 2056-2068. https://pubmed.ncbi.nlm.nih.gov/17513383/.
O'Connell M, McClure N, Lewis SE. The effects of cryopreservation on sperm morphology, motility and mitochondrial function. *Hum Reprod* 2002; 17: 704-709. https://pubmed.ncbi.nlm.nih.gov/11870124/.
Ogura T, Shuba LM, McDonald TF. Action potentials, ionic currents and cell water in guinea pig ventricular preparations exposed to dimethyl sulfoxide. *J Pharmacol Exp Ther* 1995; 273: 1273-1286. https://pubmed.ncbi.nlm.nih.gov/7540688/.
Pegg DE. Principles of cryopreservation. *Methods Mol Biol* 2007; 368: 39-57. https://pubmed.ncbi.nlm.nih.gov/18080461/.
Porter WH. Ethylene glycol poisoning: Quintessential clinical toxicology; analytical conundrum. *Clin Chim Acta* 2012; 413: 365-377. https://pubmed.ncbi.nlm.nih.gov/22085425/.
Qi W, Ding D, Salvi RJ. Cytotoxic effects of dimethyl sulphoxide (DMSO) on cochlear organotypic cultures. *Hear Res* 2008; 236: 52-60. https://pubmed.ncbi.nlm.nih.gov/18207679/.
Ren L, Zhang D, Jiang XN, Gai Y, Wang WM, Reed BM, Shen XH. Peroxidation due to cryoprotectant treatment is a vital factor for cell survival in *Arabidopsis* cryopreservation. *Plant Sci* 2013; 212: 37-47. https://pubmed.ncbi.nlm.nih.gov/24094052/.
Richardi J, Krienke H, Fries HF. Dielectric constants of liquid formamide, N-methylformamide and dimethylformamide via molecular Ornstein-Zernike theory. *Chem Phys Lett* 1997; 273: 115-121. https://jglobal.jst.go.jp/en/detail?JGLOBAL_ID=200902170660831260.
Royere D, Barthelemy C, Hamamah S, Lansac J. Cryopreservation of spermatozoa: A 1996 review. *Hum Reprod Update* 1996; 2: 553-559. https://pubmed.ncbi.nlm.nih.gov/9111188/.
Samoszuk M, Reid ME, Toy PT. Intravenous dimethylsulfoxide therapy causes severe hemolysis mimicking a hemolytic transfusion reaction. *Transfusion* 1983; 23: 405. https://pubmed.ncbi.nlm.nih.gov/6623613/.
Shlafer M, Karow AM., Jr. Pharmacological effects of dimethyl sulfoxide on the mammalian myocardium. *Ann NY Acad Sci* 1975; 243: 110-121. https://pubmed.ncbi.nlm.nih.gov/236711/.
Somfai T, Nakai M, Tanihara F, Noguchi J, Kaneko H, Kashiwazaki N, Egerszegi I, Nagai T, Kikuchi K. Comparison of ethylene glycol and propylene glycol for the vitrification of immature porcine oocytes. *J Reprod Dev* 2013; 59: 378-384. https://www.ncbi.nlm.nih.gov/pmc/articles/PMC3944359/.
Songsasen N, Yu IJ, Ratterree MS, VandeVoort CA, Leibo SP. Effect of chilling on the organization of tubulin and chromosomes in rhesus monkey oocytes. *Fertil Steril* 2002; 77: 818-825. https://pubmed.ncbi.nlm.nih.gov/11937140/.
Stroh C, Cassens U, Samraj A, Sibrowski W, Schulze-Osthoff K, Los M. The role of caspases in cryoinjury: Caspase inhibition strongly improves the recovery of cryopreserved hematopoietic and other cells. *FASEB J* 2002; 16: 1651-1653. https://pubmed.ncbi.nlm.nih.gov/12207004/.
Sutton RL. Critical cooling rates for aqueous cryoprotectants in the presence of sugars and polysaccharides. *Cryobiology* 1992; 29: 585-598. https://pubmed.ncbi.nlm.nih.gov/1424715/.
Szurek EA, Eroglu A. Comparison and avoidance of toxicity of penetrating cryoprotectants. *PLoS One* 2011; 6: e27604. https://journals.plos.org/plosone/article?id=10.1371/journal.pone.0027604.
Taylor MJ, Baicu S. Review of vitreous islet cryopreservation: Some practical issues and their resolution. *Organogenesis* 2009; 5: 155-166. https://www.ncbi.nlm.nih.gov/pmc/articles/PMC2781096/.
Valdez CA, Abas Mazni O, Takahashi Y, Fujikawa S, Kanagawa H. Successful cryopreservation of mouse blastocysts using a new vitrification solution. *J Reprod Fertil* 1992; 96: 793-802. https://pubmed.ncbi.nlm.nih.gov/1339859/.
Wang X, Hua TC, Sun DW, Liu B, Yang G, Cao Y. Cryopreservation of tissue-engineered dermal replacement in Me2SO: Toxicity study and effects of concentration and cooling rates on cell viability. *Cryobiology* 2007; 55: 60-65. https://pubmed.ncbi.nlm.nih.gov/17618999/.

(56) References Cited

OTHER PUBLICATIONS

Wang Y, Tao F, Xu P. Glycerol dehydrogenase plays a dual role in glycerol metabolism and 2,3-butanediol formation in Klebsiella pneumoniae. *J Biol Chem* 2014; 289: 6080-6090. https://www.ncbi.nlm.nih.gov/pmc/articles/PMC3937674/.

Warheit DB, Kinney LA, Carakostas MC, Ross PE. Inhalation toxicity study of formamide in rats. *Fundam Appl Toxicol* 1989; 13: 702-713. https://pubmed.ncbi.nlm.nih.gov/2620791/.

Weber MH, Marahiel MA. Coping with the cold: The cold shock response in the Gram-positive soil bacterium *Bacillus subtilis*. *Philos Trans R Soc Lond B Biol Sci* 2002; 29; 357: 895-907. https://www.ncbi.nlm.nih.gov/pmc/articles/PMC1693001/.

Westh P. Preferential interaction of dimethyl sulfoxide and phosphatidyl choline membranes. *Biochim Biophys Acta* 2004; 1664: 217-223. https://pubmed.ncbi.nlm.nih.gov/15328054/.

Wood DC, Wirth NV, Weber FS, Palmquist MA. Mechanism considerations of dimethyl sulfoxide (DMSO)-lenticular changes in rabbits. *J Pharmacol Exp Ther* 1971; 177: 528-535. https://pubmed.ncbi.nlm.nih.gov/5568808/.

Wusteman MC, Pegg DE, Robinson MP, Wang LH, Fitch P. Vitrification media: Toxicity, permeability, and dielectric properties. *Cryobiology* 2002; 44: 24-37. https://pure.york.ac.uk/portal/en/publications/vitrification-media-toxicity-permeability-and-dieletric-properti.

Yu ZW, Quinn PJ. Dimethyl sulphoxide: A review of its applications in cell biology. *Biosci Rep* 1994; 14: 259-281. https://pubmed.ncbi.nlm.nih.gov/7620078/.

Zhang YZ, Zhang SC, Liu XZ, Xu YJ, Hu JH, Xu YY, Li J, Chen SL. Toxicity and protective efficiency of cryoprotectants to flounder (*Paralichthys olivaceus*) embryos. *Theriogenology* 2005; 63: 763-773. https://pubmed.ncbi.nlm.nih.gov/15629795/.

\* cited by examiner

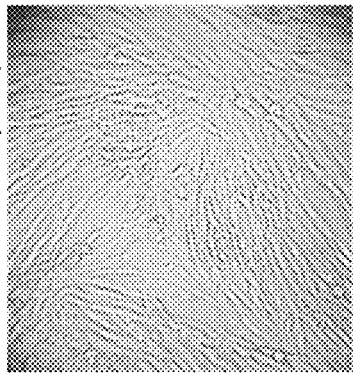
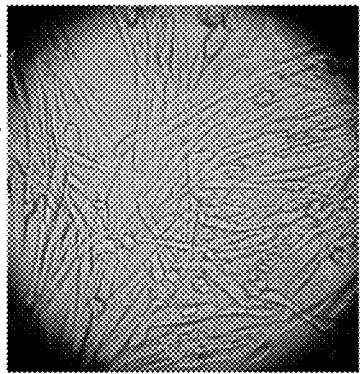
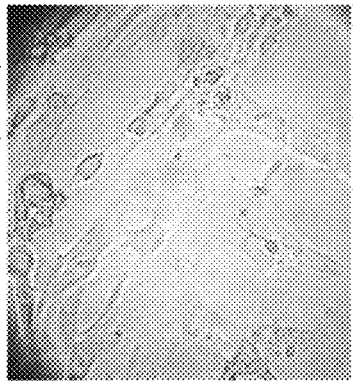

CYTOPROTECTIVE COMPOSITIONS FOR SHORT-TERM CELLS STORAGE AND TRANSPORTATION WITHOUT CRYOPRESERVATION AND DEEP FREEZING

BACKGROUND

Technical Field

The embodiments herein generally relate to cell cytoprotective compositions, and more particularly to cell cytoprotective compositions for short-term cell storage and transportation.

Description of the Related Art

Cell cryopreservation has evolved as an important technology required for supporting various cell-based applications, such as stem cell therapy, tissue engineering, and assisted reproduction. Recent requirements have witnessed an increase in the clinical demand of these applications, requiring urgent improvements in cell cryopreservation.

However, cryopreservation technology tends to suffer from the issues of low cryopreservation efficiency and cryoprotectant (CPA) toxicity. Moreover, cell cryopreservation has become an important supporting technology for various cell-based applications such as stem cell therapy, tissue engineering, assisted human reproduction, and transfusion medicine.

However, during freezing-thawing cycles, cells inevitably suffer from cryoinjuries, including solution injury and ice injury. The freeze concentration-induced excessive dehydration can damage cells resulting in solution injury. Besides this, ice formation and growth during cryopreservation can mechanically damage the biological structure of cells resulting in ice injury. Cryoprotectants (CPAs) play a pivotal role in protecting cells against these cryoinjuries and allow their successful storage at cryogenic temperatures. CPAs can be broadly classified into two main categories on the basis of the permeability or non-permeability of CPAs into the cellular membrane. Permeating CPAs mainly include organic solvents, such as glycerol and DMSO, which can permeate phosphate bilayers. This permeability is usually driven by a concentration gradient and confers intracellular protection to cells.

Most of the organic solvent CPAs exhibit toxicity or poor biocompatibility that can cause serious side effects in patients like hemolysis, neurotoxicity, cardiovascular failure, respiratory arrest, and fatal arrhythmias. In comparison with this, non-permeating CPAs provide extracellular protection only. These include natural non-toxic carbohydrates (such as trehalose and sucrose) and biomacromolecules (such as proteins and polymers). Generally, non-permeating CPAs are combined with permeating CPAs to ensure both extracellular and intracellular protection, where the latter is required for the critical protection of cells from inside. This results in a compromise between high cryopreservation efficiency and CPA toxicity.

For most cell types, conventional cryopreservation protocol involves stepwise freezing of a sample at slow cooling rates using 10-20% dimethylsulfoxide (DMSO) solution. In order to improve cell cryopreservation efficiency, previous studies have mainly focused on the optimization of CPA formulation, CPA introduction, and freezing-thawing protocol suitable for different cell types. Other studies have reported the use of a differential evolution algorithm to optimize cryopreservation protocols for Jurkat cells (300 mmol/L trehalose, 10% glycerol, and 0.01% ectoine at 10° C./min) and mesenchymal stem cells (300 mmol/L ethylene glycol, 1 mmol/L taurine, and 1% ectoine at 1° C./min), which results in post-thawing cell viabilities of 95% and 96%, respectively. However, the optimization of cryopreservation protocol still suffers from two major challenges: (1) unfavorable post-thaw cell viability or functions, and (2) safety concerns induced by CPA toxicity. For cryopreservation of hepatocytes, some studies reported only 61-75% survival of isolated cells post-cryopreservation, and post-thawing cell attachment efficiency of 30-39%.

Besides this, there are reports where the critical functions in some of the therapeutic cells such as mesenchymal stem cells (MSCs), natural killer cells, and dendritic cells (DCs) were compromised after use of conventional cryopreservation protocol. Organic solvents glycerol and DMSO are widely used in intracellular protection; however, both lack biocompatibility. Glycerol can induce severe hemolysis, while the use of DMSO is found to be associated with many side effects in patients, like neurotoxicity, cardiovascular failure, respiratory arrest, fatal arrhythmias, and others.

Long-term (i.e., years and decades) storage of stem/progenitor cells remains a very important problem, because it is necessary for the operation of cord blood banks, the development of commercial cell lines, and research in the field of stem cell biology. However, now, when technologies for the separation of stem/progenitor cells and protocols for their use for the treatment of human diseases have already been developed and are being intensively introduced into regenerative medicine through clinical trials, the search for ways to preserve cells without damaging them, which inevitably occurs during deep freezing and thawing of cellular suspensions. In addition, the need for expensive transportation of stem/progenitor cells from biotechnology laboratories to hospitals where clinical trials are conducted significantly increases the cost of the clinical trials themselves, and most importantly, exposes cell suspensions to the risk of thawing during transportation, which dramatically reduces the number of viable cells and negatively effects on the effectiveness of cell therapy.

Currently, the storage time of stem/progenitor cells (both allogeneic and autologous) from the moment of their isolation and reproduction to transfer to clinical trials depends on three factors. The first factor is the characterization of the cell suspension as required by the Guidelines. It takes 2-3 days in modern biotechnology laboratories. The second factor is the control of viral contamination. Assessment of viral contamination by real-time PCR analysis also requires at least 2-3 days. The third factor influencing the storage time of cells is the control of microbial and fungal contamination of the cell suspension. This is the main factor affecting the time from prepared cell product from lab to clinical trials/bedside. The technology for controlling microbial and fungal cell contamination requires at least two weeks. During this time, storage of cells at room temperature or at a temperature that does not cause the formation of intracellular ice (+4° C.) leads to a loss of viability of 70-90% of the cells in the stored cell suspension. That is why stem/progenitor cell suspensions are programmed to deep-freeze in liquid nitrogen using toxic cryoprotectants. Accordingly, there remains a problem in the industry of the short-term storage of stem/progenitor cell suspensions for required period of characterization, biosafety assessment, and transport from the biotechnology laboratory to the place of clinical trials.

SUMMARY

In view of the foregoing, an embodiment provides a composition comprising a mixture comprising quercetin, taurine hydrochloride, and mildronate [3-(2,2,2-trimethylhydrazinium) propionate]; and a solution comprising a stabilizing solution, an organ preservation solution, or a combination thereof, wherein the mixture and solution comprise a temperature between 4° C. and 25±2° C. The quercetin may comprise a concentration of 20 µM. The taurine hydrochloride may comprise a concentration of 150 µM. The mildronate may comprise a concentration of 40 µM. The stabilizing solution may comprise an aqueous solution comprising salts and confers on the composition a pH of between 7.32 and 7.36. The stabilizing solution may comprise an aqueous solution comprising 90 mM NaCl, 23 mM Na gluconate, 2.5 mM $CaCl_2$, 27 mM Na acetate, 1.5 mM $MgCl_2$, 5 mM KCl, and a pH of 7.34. The stabilizing solution may comprise an aqueous solution comprising 25 mM NaCl, 2.5 mM KCl, 1.25 mM $NaH_2PO_4$, 2 mM $CaCl_2$, 1 mM $MgCl_2$, 25 mM $NaHCO_3$, 25 mM glucose, a pH of 7.34, and 290-310 mOsmol/l.

The organ preservation solution may comprise an aqueous solution having a pH of between 6.5 and 7.5 and comprising salts, sugars, antioxidants, and active agents. The quercetin, taurine hydrochloride, and mildronate may be combined with the organ preservation solution. The solution may comprise an aqueous solution comprising chloride, sulfate, sodium, calcium, magnesium or potassium ions; sugars selected from mannitol, raffinose, sucrose, glucose, fructose, lactobionate and gluconate; glutathione; active agents selected from xanthine oxidase inhibitors, lactates, and amino acids. The solution may comprise colloids selected from hydroxyethyl starch, polyethylene glycol, and dextran.

The composition may comprise calcium ions in an amount between 0 and 0.5 mM; KOH in an amount between 20 and 100 mM; NaOH in an amount between 20 and 125 mM; $KH_2PO_4$ in an amount between 20 and 25 mM; $MgCl_2$ in an amount between 3 and 5 mM; at least one sugar chosen from raffinose and glucose; adenosine in an amount between 3 and 5 mM; glutathione in an amount between 2 and 4 mM; allopurinol in an amount between 0 and 1 mM; and at least one compound selected from hydroxyethyl starch, polyethylene glycols of various molecular weights and human serum albumin in an amount between 1 and 50 g/l; wherein a pH of the solution is adjusted to 7.34 by acid-base neutralizing titration. The temperature of the mixture and solution may be selected to preserve stem/progenitor cells during a storage preservation time. The storage preservation time may comprise approximately 3 weeks at 4° C.+1 week at 25±2° C.

Another embodiment provides a composition having a pH of between 7.32 and 7.36 and comprising quercetin; taurine hydrochloride; mildronate [3-(2,2,2-trimethylhydrazinium) propionate]; calcium ions; KOH; NaOH; $KH_2PO_4$; $MgCl_2$; at least one sugar chosen from raffinose and glucose; adenosine; glutathione; allopurinol; and at least one compound chosen from hydroxyethyl starch, polyethylene glycols, and human serum albumin.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 3(A) through 3(D) are additional magnified images of cell density/counts in experimental solutions, according to the embodiments herein;

DETAILED DESCRIPTION

Figure 1A:
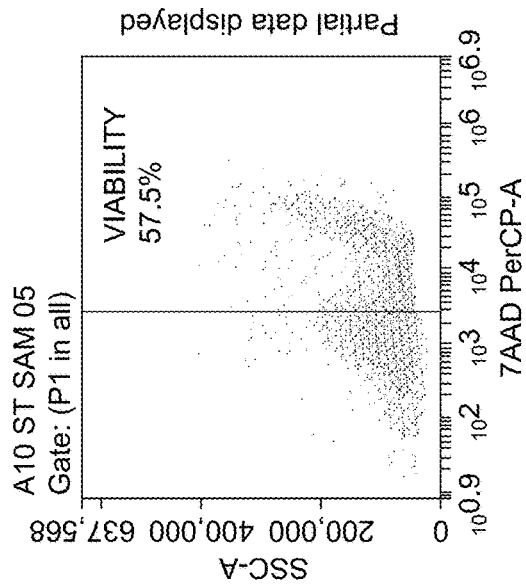
FIGS. 1(A) through 1(P) are graphical plots illustrating placental cell viability, assessed by 7ADD in flow cytometer, according to an experiment conducted of the embodiments herein.
Figure 1B:
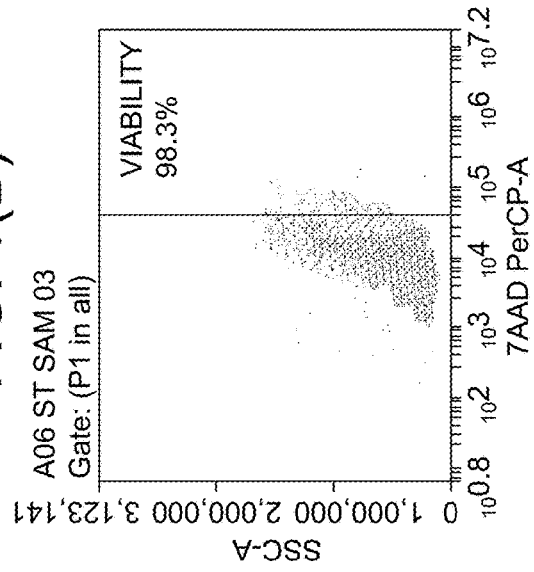
Figure 1C:
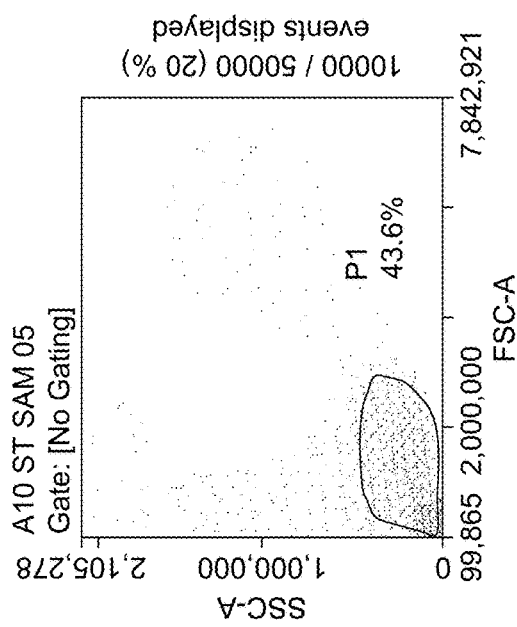
Figure 1D:
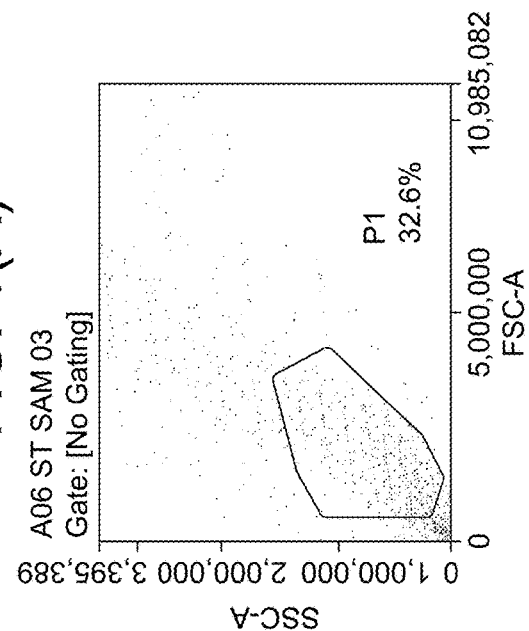
Figure 1E:
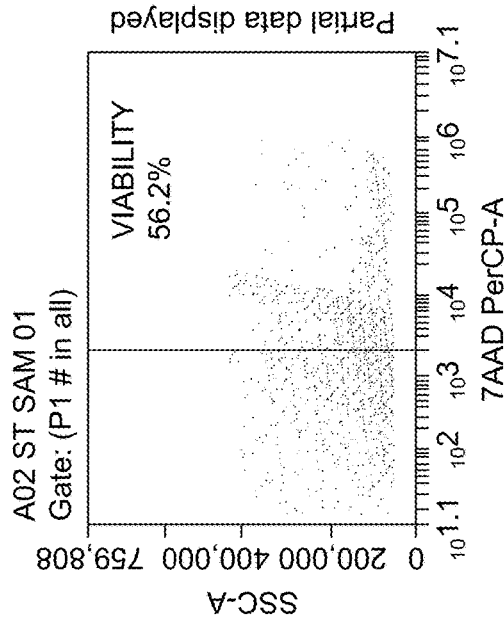
Figure 1G:
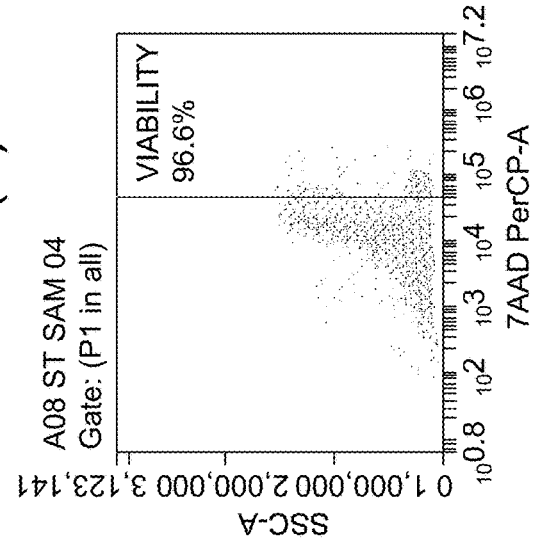
Figure 1F:
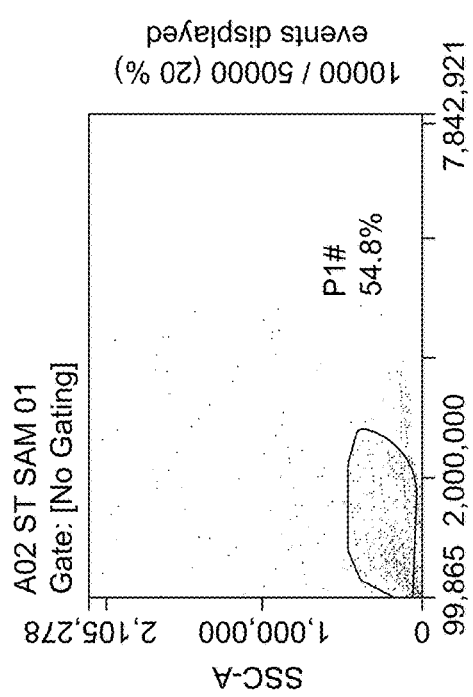
Figure 1H:
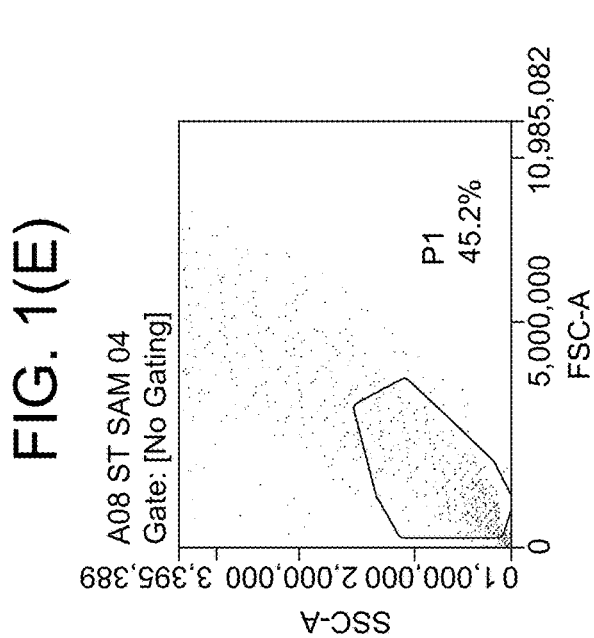
Figure 1I:
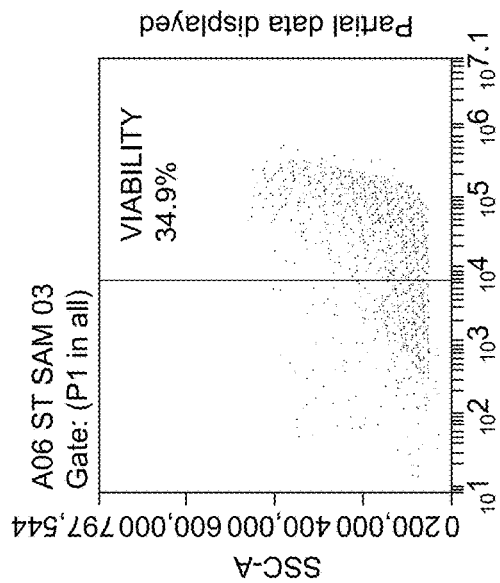
Figure 1K:
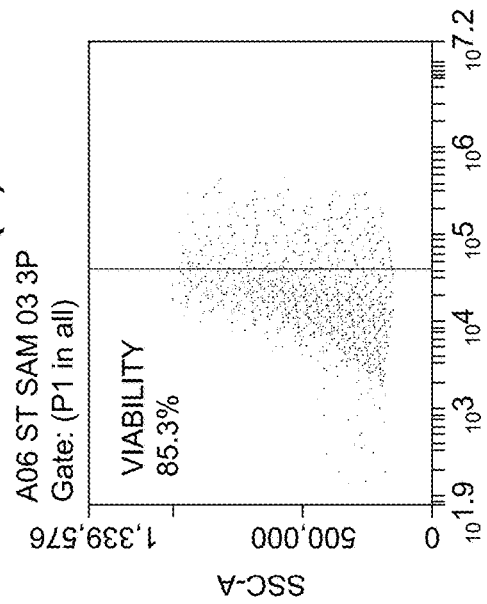
Figure 1J:
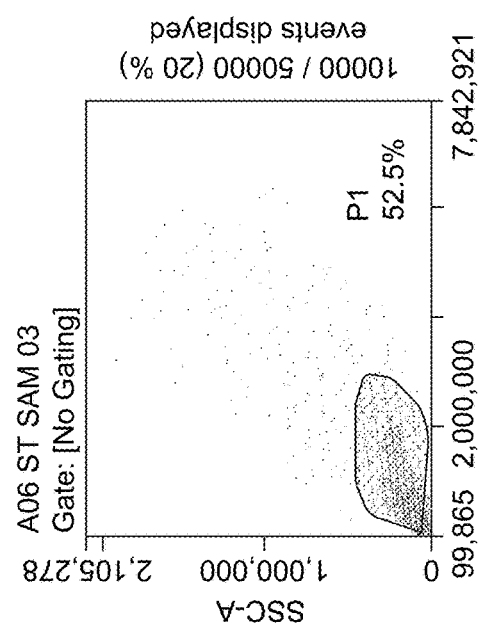
Figure 1L:
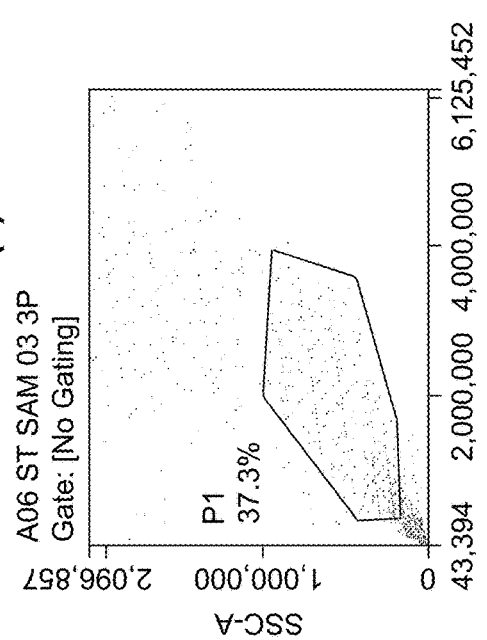
Figure 1M:
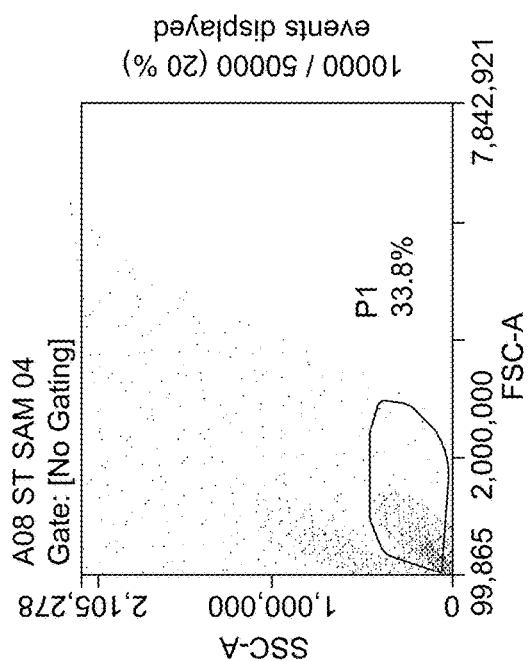
Figure 1O:
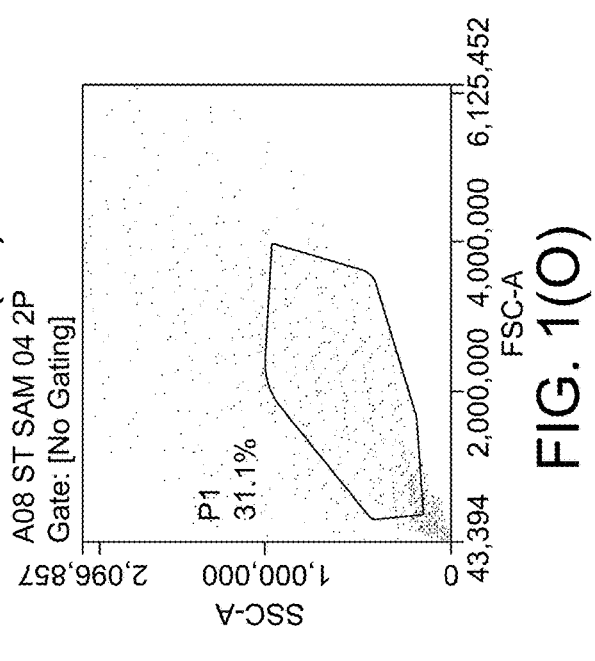
Figure 1N:
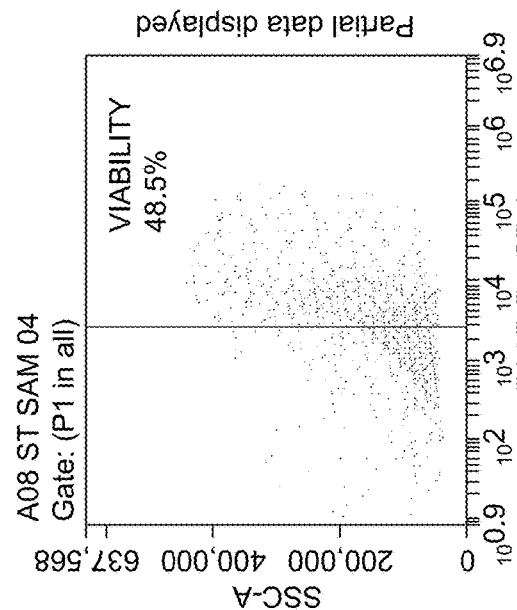

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a cytoprotective composition that allows the suspension of stem/progenitor cells to be maintained for at least three weeks at 4° C. and one week at room temperature (25±2° C.) without losing cell viability and proliferation ability. An experimental comparative analysis of the effectiveness of the composition provided by the embodiments herein compared with the "Custodiol-CE" solution, which is widely used for the transportation of organs, tissues and cells intended for transplantation, is also provided. Referring now to the drawings, and more particularly to FIGS. 1(A) through 5(L), there are shown exemplary embodiments. In the drawings, the size and relative sizes of components, layers, and regions, etc. may be exaggerated for clarity.

The embodiments herein relate to the use of a composition comprising at least three main components that provide cell protection: quercetin, taurine and mildronate, a stabilizing solution and/or a clinically used organ preservation solution, said composition having a temperature of between 4° C. and 25±2° C., for preserving at least one type of stem/progenitor cells for a short storage period (i.e., 4 weeks) necessary for their characterization, assessment of biological safety and transportation to the patient's bed without the use of cryoprotectants and deep freezing.

Regenerative medicine is the restoration of the function of damaged organs and systems using stem/progenitor cells. One of the challenges of regenerative medicine remains the cell preservation duration. Indeed, in normothermia (37° C.), before and/or after isolation of stem/progenitor cells, the cell undergoes a period of warm ischemia and is damaged in conditions of oxygen deficiency. After isolation of the cell suspension, a certain period of time (i.e., from 3 to 4 weeks) is required for their characterization and assessment of biological safety (i.e., the control of contamination of the cell suspension for absence of viruses, microbes and fungi). This necessitates the deep freezing (cryopreserve) of cells using cryoprotectants and liquid nitrogen.

If shallow freezing is used up to 4° C., then a decrease in tissue temperature leads to a decrease in cellular metabolism, that is, a slowdown in catalytic enzymatic activity necessary for cell viability but does not stop its metabolic activity. For example, a transplant organ cooled to 4° C. experiences a metabolic decline of about 85%. Not deep hypothermia allows one to fight the harmful effects of oxygen starvation and nutritional deficiencies caused by circulatory arrest, and slows down cell death, but only for a short time; i.e., 1-2 days. This is because even though the metabolism of cells stored at 4° C. is reduced, they still need oxygen, like all aerobic tissues. With an increase in storage time at 4° C., cells are destroyed due to lack of oxygen and ischemic oxidative stress.

On the other hand, in deep frozen cells during freezing-thawing cycles, cells inevitably suffer from cryoinjuries, including solution injury and ice injury. The freeze concentration-induced excessive dehydration can damage cells resulting in solution injury. Besides this, ice formation during cryopreservation can mechanically damage the biological structure of cells resulting in ice injury. Cryoprotectants (CPAs) play a pivotal role in protecting cells against these cryoinjuries and allow their successful storage at cryogenic temperatures. CPAs can be broadly classified into two main categories on the basis of the permeability or non-permeability of CPAs into the cellular membrane. Permeating CPAs mainly include organic solvents, such as glycerol and DMSO, which can permeate phosphate bilayers. This permeability is usually driven by a concentration gradient and confers intracellular protection to cells.

Most of the organic solvent CPAs exhibit toxicity or poor biocompatibility that can cause serious side effects in patients like hemolysis, neurotoxicity, cardiovascular failure, respiratory arrest, and fatal arrhythmias. In comparison with this, non-permeating CPAs provide extracellular protection only. These include natural non-toxic carbohydrates (such as trehalose and sucrose) and biomacromolecules (such as proteins and polymers). Generally, non-permeating CPAs are combined with permeating CPAs to ensure both extracellular and intracellular protection, where the latter is required for the critical protection of cells from inside. This results in a compromise between high cryopreservation efficiency and CPA toxicity, but does not completely solve the problem.

The embodiments herein utilizes an iso-osmolar to blood plasma aqueous saline solution QTM (290-310 mOsmol/l) comprising sodium, potassium, magnesium and calcium salts (for example, but not necessarily: 90 mM NaCl, 23 mM Na gluconate, 2.5 mM $CaCl_2$), 27 mM Na acetate, 1.5 mM $MgCl_2$, 5 mM KCl; pH 7.34; or, optionally, 25 mM NaCl, 2.5 mM KCl, 1.25 mM $NaH_2PO_4$, 2 mM $CaCl_2$, 1 mM $MgCl_2$, 25 mM $NaHCO_3$, 25 mM glucose, pH 7.34) in which the main components are 20 μM quercetin (Q), 150 μM taurine hydrochloride (T) and 40 μM Mildronate [3-(2,2,2-trimethylhydrazinium) propionate](M).

This aqueous solution also can be formulated with organ preservation solutions, that is, quercetin, taurine hydrochloride, and mildronate can be mixed with organ preservation solutions. In such a case, preferably, the aqueous solution contains 90 mM NaCl, 23 mM Na gluconate, 2.5 mM $CaCl_2$), 27 mM Na acetate, 1.5 mM $MgCl_2$, 5 mM KCl, and has a pH of 7.34 with an osmolarity of 300 to 310, and preferably 305 mOsmol/l.

According to the embodiments herein, the stem/progenitor cells preservation is carried out immediately after isolation of cells from donor tissues. The composition provided by the embodiments herein comprises at least quercetin, taurine hydrochloride, mildronate, and a stabilizing solution and/or an organ preservation solution. The stabilizing solution according to the embodiments herein is an aqueous solution containing salts, preferably chloride, sodium, calcium, magnesium and potassium ions, and gives the composition a pH of 7.34, wherein its composition is physiologically similar to the injectable fluid, and it can be used alone as a preservative solution, or in combination with a commercial organ preservation solution. In the present description, the pH is understood to be at ambient temperature (25° C.), unless otherwise mentioned.

Preferably, the stabilizing solution is an aqueous solution comprising sodium chloride, calcium chloride, magnesium chloride, potassium chloride, and also sodium gluconate and sodium acetate, and has a pH of between 7.32 and 7.36, preferably of approximately 7.34. More preferentially, the stabilizing solution is an aqueous solution comprising 90 mM of NaCl, 23 mM of Na gluconate, 2.5 mM of $CaCl_2$), 27 mM of Na acetate, 1.5 mM of $MgCl_2$, 5 mM of KCl, and has a pH of 7.34, and can contain between 0 and 100 mM of antioxidant of ascorbic acid and/or reduced glutathione type. The solution preferably has an osmolarity of between 300 and 310, and preferentially of 305 mOsmol/l.

In addition, the composition according to the embodiments herein may contain a solution for the preservation of organs. This solution helps to maintain basic cell metabolism. It helps to protect and prevent damage caused by ischemia and reoxygenation of cells and to optimize cell resumption of function. Thus, the organ preservation solution is clinically acceptable.

The organ preservation solution may be an aqueous solution which has a pH of between 6.5 and 7.5, comprising salts, preferably chloride, sulfate, sodium, calcium, magnesium and potassium ions; sugars, preferably mannitol, raffinose, sucrose, glucose, fructose, lactobionate (which is an impermeant), or gluconate; antioxidants, preferably glutathione; active agents, preferably xanthine oxidase inhibitors, such as allopurinol, lactates, amino acids such as histidine, glutamic acid (or glutamate) or tryptophan; and optionally colloids such as hydroxyethyl starch, polyethylene glycol or dextran.

According to an embodiment herein, the organ preservation solution is chosen from (A) University of Wisconsin (UW or Viaspan®) solution, which has an osmolality of 320 mOsmol/kg and a pH of 7.4, having the following formulation for one liter in water: Potassium lactobionate: 100 mM, KOH: 100 mM, NaOH: 27 mM, $KH_2PO_4$: 25 mM, $MgSO_4$: 5 mM, Raffinose: 30 mM, Adenosine: 5 mM, Glutathione: 3 mM, Allopurinol: 1 mM, Hydroxyethyl starch: 50 g/l. The final pH of the solution is adjusted to 7.34 by acid-base neutralizing titration.

(B) IGL-1®, which has an osmolality of 320 mOsm/kg and a pH of 7.4, having the following formulation in water per liter: NaCl: 125 mM, $KH_2PO_4$: 25 mM, $MgSO_4$: 5 mM, Raffinose: 30 mM, Potassium lactobionate: 100 mM, Glutathione: 3 mM, Allopurinol: 1 mM, Adenosine: 5 mM, Polyethylene glycol (molecular weight: 35 kDa): 1 g/l. The final pH of the solution is adjusted to 7.34 by acid-base neutralizing titration.

(C) Celsior®, which has an osmolality of 320 mOsm/kg and a pH of 7.3, having the following formulation in water per liter: Glutathione: 3 mM, Mannitol: 60 mM, Lactobionic acid: 80 mM, Glutamic acid: 20 mM, NaOH: 100 mM, Calcium chloride dihydrate: 0.25 mM, $MgSO_4$: 1.2 mM, KCl: 15 mM, Magnesium chloride hexahydrate: 13 mM, Histidine: 30 mM. The final pH of the solution is adjusted to 7.34 by acid-base neutralizing titration.

(D) Custodiol® HTK Solution, having the following formulation in water per liter, the pH being 7.20 at ambient temperature, and the osmolality being 310 mOsm/kg: NaCl: 18.0 mM, KCl: 15.0 mM, $KH_2PO_4$: 9 mM, Hydrogenated potassium 2-ketoglutarate: 1.0 mM, Magnesium chloride hexahydrate: 4.0 mM, Histidine·HCl·$H_2O$: 18.0 mM, Histidine: 198.0 mM, Tryptophan: 2.0 mM, Mannitol: 30.0 mM, Calcium chloride dihydrate: 0.015 mM. The final pH of the solution is adjusted to 7.34 by acid-base neutralizing titration.

(E) Perfadex®, which has an osmolarity of 295 mOsmol/l having the following formulation in water: 50 g/l of dextran 40 (molecular weight: 40,000), Na+: 138 mM, K+: 6 mM, Mg2+: 0.8 mM, Cl−: 142 mM, $SO_4$ 2−: 0.8 mM, ($H_2PO_4$−+$HPO_4$ 2−): 0.8 mM and Glucose: 5 mM. The final pH of the solution is adjusted to 7.34 by acid-base neutralizing titration.

(F) Ringer lactate®, having the following formulation in water, the pH being between 6.0 and 7.5 at ambient temperature, and having an osmolarity of 276.8 mOsmol/l: Na+: 130 mM, K+: 5.4 mM, Ca2+: 1.8 mM, Cl−: 111 mM, Lactates: 27.7 mM. The final pH of the solution is adjusted to 7.34 by acid-base neutralizing titration.

(G) Plegisol®, having the following formulation in water: KCl: 1.193 g/l, $MgCl_2$·6 $H_2O$: 3.253 g/l, NaCl: 6.43 g/l, $CaCl_2$): 0.176 g/l. The final pH of the solution is adjusted to 7.34 by acid-base neutralizing titration.

(H) Solution of the Edouard Henriot hospital, having the following formulation in water, the pH being equal to 7.4 at ambient temperature, and which has an osmolarity of 320 mOsmol/l: KOH: 25 mM, NaOH: 125 mM, $KH_2PO_4$: 25 mM, $MgCl_2$: 5 mM, $MgSO_4$: 5 mM, Raffinose: 30 mM, Lactobionate: 100 mM, Glutathione: 3 mM, Allopurinol: 1 mM, Adenosine: 5 mM, Hydroxyethyl starch 50 g/l. The final pH of the solution is adjusted to 7.34 by acid-base neutralizing titration.

All these organ preservation solutions are commercial products.

The embodiments herein are now illustrated by means of the examples below, which are not limited by the specific techniques and descriptions provided.

EXAMPLE

To test the viability of cells during short-term storage, the Custodiol-QTM solution was prepared based on commercial Custodiol-CE solution, to which were added at the final concentration: 20 µM quercetin (Q), 150 µM taurine hydrochloride (T) and 40 µM Mildronate (M). The comparator was the Custodiol-CE solution.

Mesenchymal stem cells were used, which were isolated from an abortive placenta obtained after medical termination of pregnancy in accordance with all regulatory and normative documents (approval of the Ethical and Institutional Committees, Informed consent, etc.). The isolation of MSCs from placental tissues was performed according to the Swiss protocol.

Preparation of the Placenta. The placenta was stored at 4° C. during transport and prior to dissection. The placenta tissue is transferred to the tray under sterile condition within the biosafety cabinet. To begin the dissection, the placenta is orientated with the umbilical cord facing upwards in the sterile tray.

This protocol is designed to yield sufficient cells to seed into one T175 flask from each of the three tissue types. Each digest begins with approximately 10 g of tissue.

Dissection of the Decidual Tissue (DT). From the maternal side of the placenta (containing decidua basalis tissue) were cut pieces of 0.5 cm thickness. Then, tissue pieces were placed into a Petri dish containing Hank's balanced salt solution (HBSS) (during the dissection the tissue pieces were hydrated). Then, 10 g of DT was transferred in a 50 ml tube.

Dissection of the Chorionic Plate Tissue (CPT). The amniotic membrane was mechanically removed from the fetal surface of the placenta (not the amniotic sac), leaving the chorionic frondosum (chorionic plate) intact. By 0.5 cm deep from the chorionic plate were cut pieces around 1 cm wide. The chorionic plate was harvested from the region nearest to the umbilical cord, away from the edge of the placenta. Tissue pieces were placed into a Petri dish containing HBSS during the dissection to keep them hydrated. Then, 10 g of DT was transferred in a 50 ml tube.

Dissection of the Chorionic Villi Tissue (CVT). CV tissue was dissected around 1 $cm^2$×0.5-1 cm deep from placental tissue where the CP has already been removed. CVT was harvested from the region closest to the umbilical cord, away from the edge of the placenta. At least 1 cm was left away from the maternal side of the placenta (containing decidua basalis tissue); the goal was to harvested tissue from the interior of the placental villi tissue. Then, tissue pieces were placed into a Petri dish containing HBSS during the dissection to keep them hydrated. Then, 10 g of DT was transferred in a 50 ml tube.

Mincing and Enzymatic Digestion of the DT, CPT, and CVT. As there were around 10 g of DT, CPT or CVT tissues in three different 50 ml tubes, each tube has been filled with approximately 40 ml of HBSS and repeatedly inverted to wash the tissue (repeated for 10 seconds). Then the supernatant was decanted and this wash step was repeated 2-3 times until the solution is largely free from blood. Tissue pieces were returned to a 10 cm Petri dish with minimal liquid transfer. The tissue was chop/mince into fine pieces of approximately 1-5 mm3 with scissors and razor blade. The minced tissues were transferred back into appropriately labeled (DT, CPT or CVT) 50 ml tubes. Then, freshly prepared digest media (100 U/ml collagenase type I, 1.5 g/ml DNase I and 2.4 U/ml dispase in serum-free DMEM) was added in 1:1 ratio with the tissue (e.g., 10 ml of tissue plus 10 ml of digest media). The cap was replaced on each tube and the tubes were inverted several times to mix. The tissues in the tubes were incubated with digest media for 2 hours at 37° C. The tubes were manually shaken rapidly and vigorously by hand for 10 seconds every 30 minutes for 2 hours.

Collection of Mononuclear Cells and Plating into Flasks. To each tube were added 30 ml of MSC media containing FBS to inactivate the enzymes contained in the digestion solution. To separate mononuclear cells from large undigested debris, a 50 ml tube was centrifuged by impulse: 5 seconds after the centrifuge reached 340×g, it was turned off until it came to a complete stop. This will cause large debris to settle to the bottom of the tube while the mononuclear cells remain in the liquid suspension. Then, supernatant, containing the mononuclear cells was collected and transferred into a new 50 ml tube with a pipette. Then 30 ml of media was added to the remaining placental tissue debris and shaken vigorously. This procedure puts the remaining detached mononuclear cells into suspension and allows a second harvest of MSCs from tissue to be obtained. The tubes were then re-centrifuged in a pulse mode and the supernatant was again transferred to a new 50 ml tube. This step was repeated a third time to maximize the efficiency of collection of mononuclear cells from each tissue source. Then, supernatants from each individual tissue type were poured into two 50 ml tubes. As a result, six tubes were obtained (two tubes DT, CPT and CVT). Each tube was centrifuged for 5 minutes at 340×g to pellet mononuclear cells to the bottom of the tube. The supernatant was carefully discarded. After removing most of the supernatant, the pellet was pooled. As a result, one tube was obtained for each tissue DT, CPT or CVT, and the pellets were resuspended in 35 ml of MSC medium. To remove cell clumps and fibrous material, the cell suspensions were filtered through a 100 μm cell strainer mounted in a 50 ml tube. Cell suspensions for each DT, CPT or CVT tissue were pooled and transferred to a single T175 flask and cultured in a humidified incubator at 37° C. and 5% $CO_2$.

Post Isolation-cell Expansion. After 48 hours, the incubation medium was removed from the flask and 35 ml of fresh MSC medium was added and the flask was incubated for an additional 24 hours. After an additional 24 hours of culture, the flask was washed twice with DPBS (25 ml) to remove debris and erythrocytes. Then, 35 ml of MSC medium was added again and incubation continued. The medium was changed twice a week and the cultures were incubated until the cell monolayers reached 80-90% confluency.

Subculture of MSCs. After reaching 80-90% confluence, the cell cultures were washed twice with 20 ml of 1×HBSS and discarded washes. To each flask T175 was added 5 ml of trypsin substitute (StemPro® Accutase®). The flasks were incubated for 5 minutes at 37° C. to release MSCs from the tissue culture surface. After separating the cells from the surface and obtaining a suspension of individual cells, the cells from the flask were washed with MSC medium and the cells were collected in tubes. MSC medium dilutes and inactivates the trypsin substitute (we used 15 ml MSC per flask T175). The contents of each tissue culture flask were then transferred to a 50 ml tube. The tubes were centrifuged at 340×g for 5 min to pellet the cells. The supernatant was removed, and the cell pellet was resuspended in 10 ml of MSC medium. The cell suspension obtained from each flask was divided by 5 ml into two tubes marked as: "Custodiol-CE" and "Custodiol QTM". Both tubes were centrifuged at 340×g for 5 minutes to pellet the cells. The supernatant was removed, and 2.0 ml of the Custodial-CE solution was added to the "Custodiol-CE" tube, and 2.0 ml of the Custodiol QTM solution (custodiol with the addition of quercetin, taurine, and mildonium) were added to the "Custodial QTM" tube.

20 vials with a suspension of MSCs "Custodiol-CE" (10 vials) and "Custodial QTM" (10 vials) were stored for three weeks at a temperature of 4° C., then for next one week they were kept at room temperature (25±2° C.). The choice of such a temperature storage regime was because it takes three weeks to characterize the cell suspension and control biological safety (control of viral, microbial and fungal contamination), and no more than 7 days are needed to transport cells to the place of clinical trials/treatment of a patient.

After such a temperature regime of cell suspensions storage, cells were transferred to new flasks (respectively "Custodiol-CE" or "Custodial QTM") at 1150 cells/cm² in fresh MSC medium and incubated in a tissue culture incubator. This seed density was consistent with inoculating 200,000 MSC into each new T175 flask in 35 ml of MSC medium. The culture medium was changed fresh twice a week to 80-90% confluence in at least one flask from any flask series—in "Custodiol-CE" and "Custodial QTM". Further, the cultured of all flasks stopped immediately.

The cell cultures were washed twice with 20 ml of 1×HBSS and discarded washes. To each flask T175 was added 5 ml of trypsin substitute (StemPro® Accutase®). The flasks were incubated for 5 minutes at 37° C. to release MSCs from the tissue culture surface. After separating the cells from the surface and obtaining a suspension of individual cells, the cells from the flask were washed with MSC medium and the cells were collected in tubes. MSC medium dilutes and inactivates the trypsin substitute (we used 15 ml MSC per flask T175). The contents of each tissue culture flask were then transferred to a 50 ml tube. The tubes were centrifuged at 340×g for 5 min to pellet the cells. The supernatant was removed, and the cell pellet was resuspended in 10 ml of 0.9% Saline. Then, the cell viability and the expression of CDs characteristic of MSCs were determined.

Figure 1P:
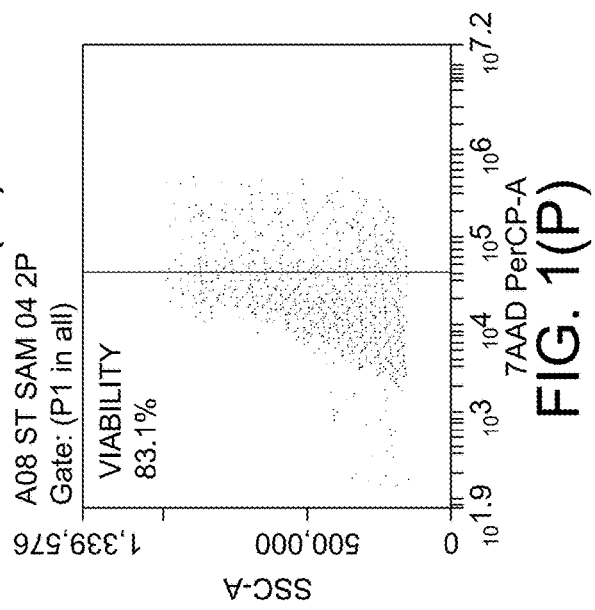

After three weeks at 4° C. and one week at room temperature (25+2° C.) storage of cell suspensions, placental cell viability, assessed by 7ADD in flow cytometer, with the results shown in FIGS. 1(A) through 1(P). The results were significantly higher when using the "Custodial QTM" solution, than during storage of cells in Custodiol-CE solution: 83.1-98.3% and 34.9-57.5%, respectively.

Figure 2B:
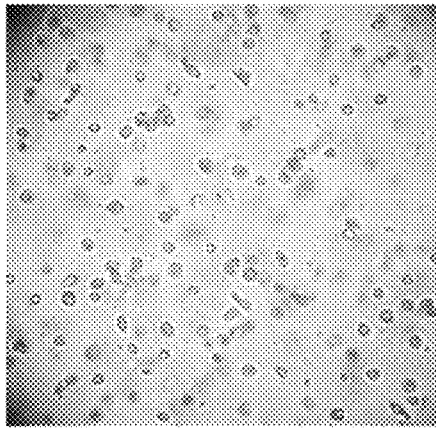
FIGS. 2(A) through 2(D) are scanning electron microscope (magnified) images of cell density/counts in experimental solutions, according to the embodiments herein.
Figure 2D:
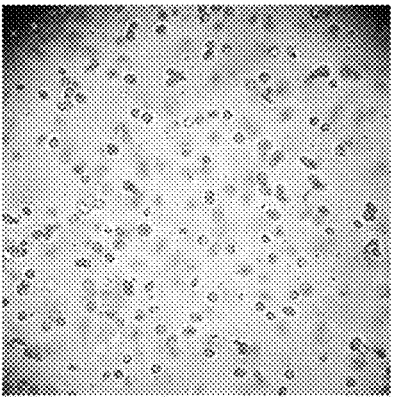
Figure 2A:
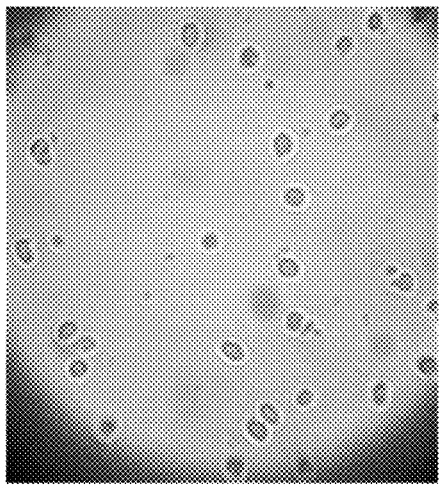
Figure 2C:
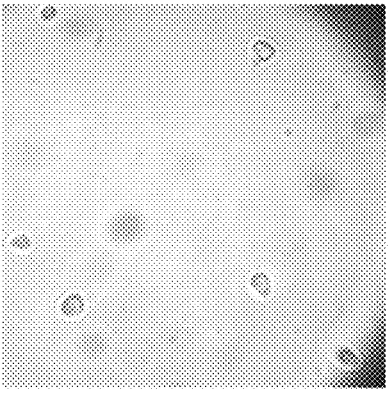

At the same seeding density (seeding was performed without considering cell viability after storage in Custodial-CE solution—flasks marked as "Custodiol-CE" and in Custodial QTM solution—flasks marked as "Custodial QTM") cell proliferation testing showed that after 48 hours of culture, the number of cells in the "Custodiol-CE" flasks progressively decreased (FIGS. 2(A) and 2(C)), while the number of cells in the "Custodial QTM" flasks, on the contrary, progressively increased (FIGS. 2(B) and 2(D)).

At the same seeding density (seeding was performed without considering the cell viability after storage) after 7 days of culturing cells in "Custodiol-CE" flasks separate clusters of fibroblast-like cells appeared with a clear impairment of the morphological structure of MSCs (FIGS. 3(A) and 3(C)), whereas in the "Custodial QTM" flask, progressive growth of MSCs with normal morphology was observed (FIGS. 3(B) and 3(D)).

Figure 4B:
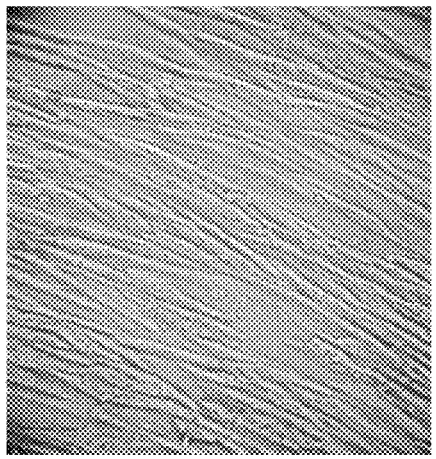
FIGS. 4(A) through 4(B) are still additional magnified images of cell density/counts in experimental solutions, according to the embodiments herein.
Figure 4A:
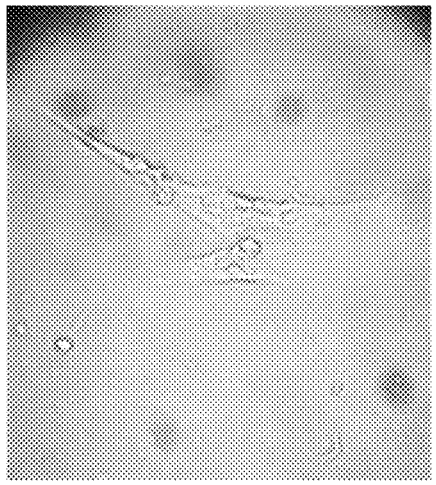
Figure 5B:
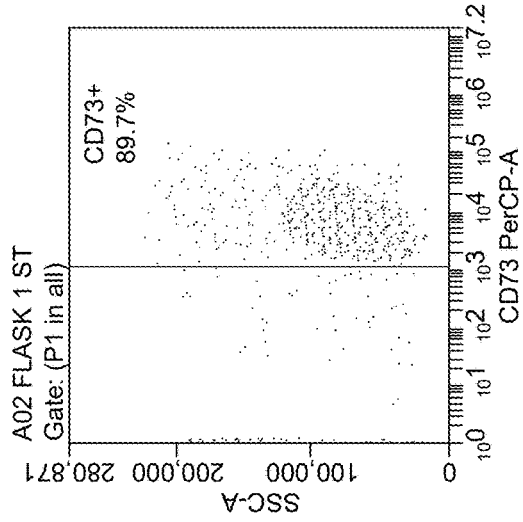
FIGS. 5(A) through 5(L) are graphical plots illustrating the phenotyping of MSCs after storage, according to an experiment conducted of the embodiments herein.
Figure 5D:
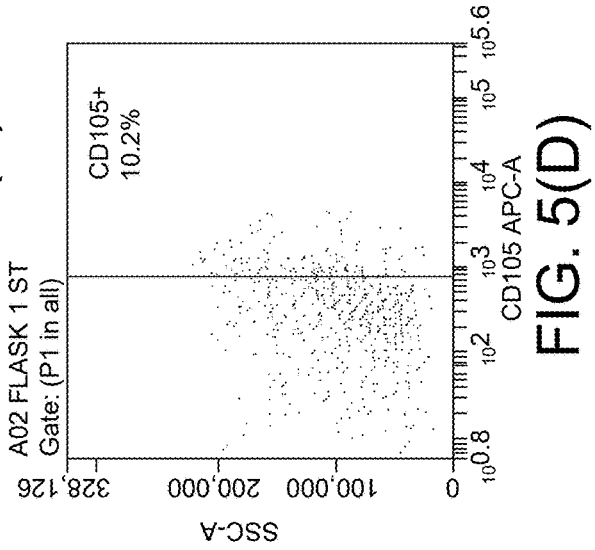
Figure 5A:
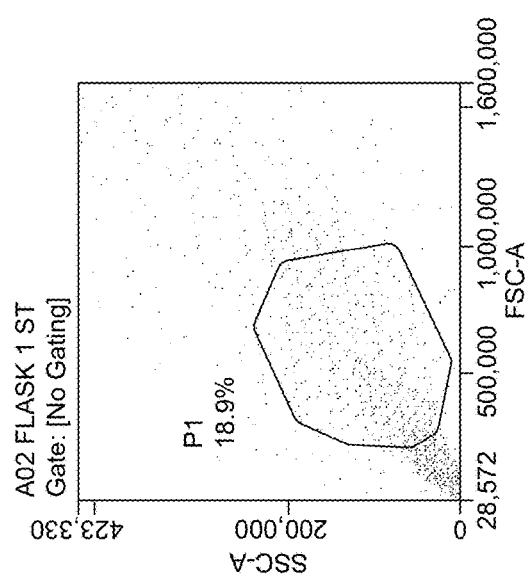
Figure 5C:
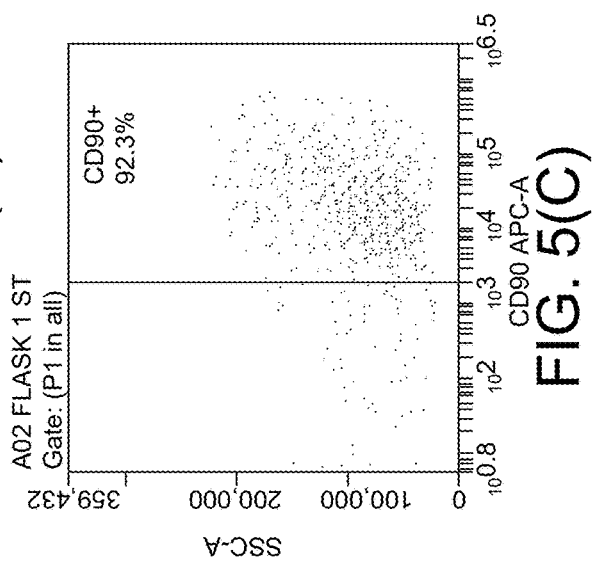
Figure 5E:
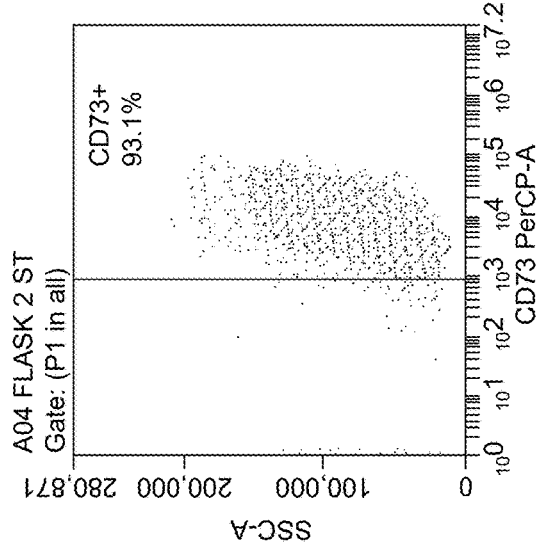
Figure 5F:
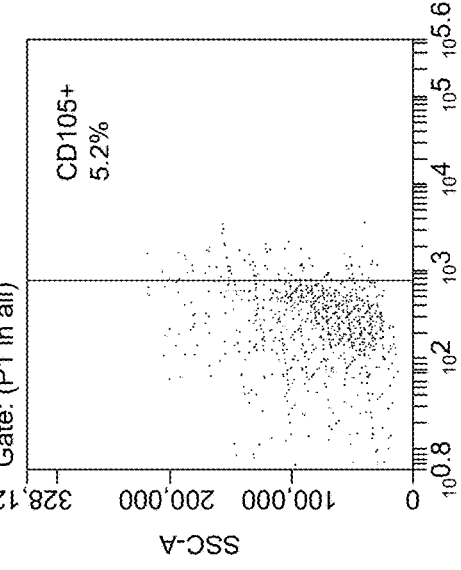
Figure 5G:
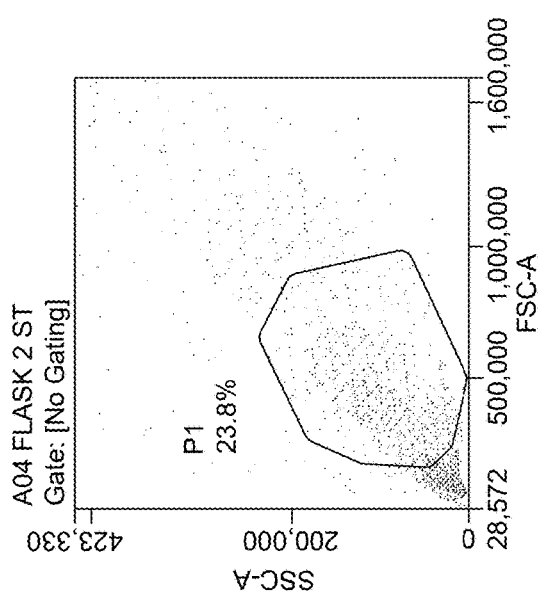
Figure 5H:
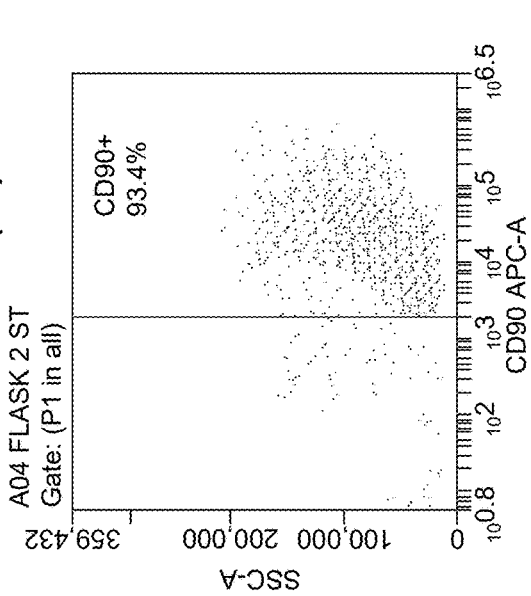
Figure 5J:
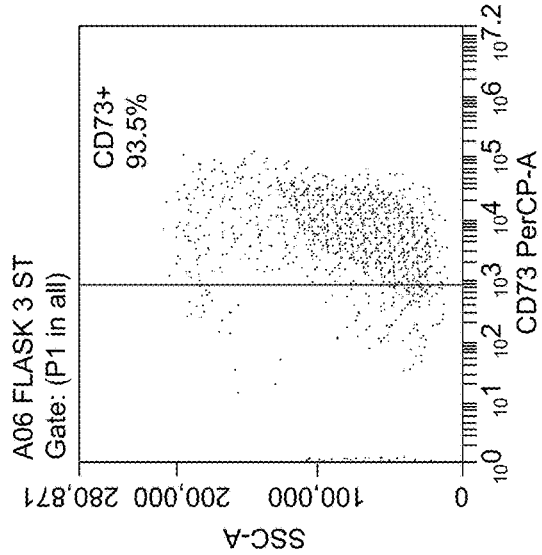
Figure 5L:
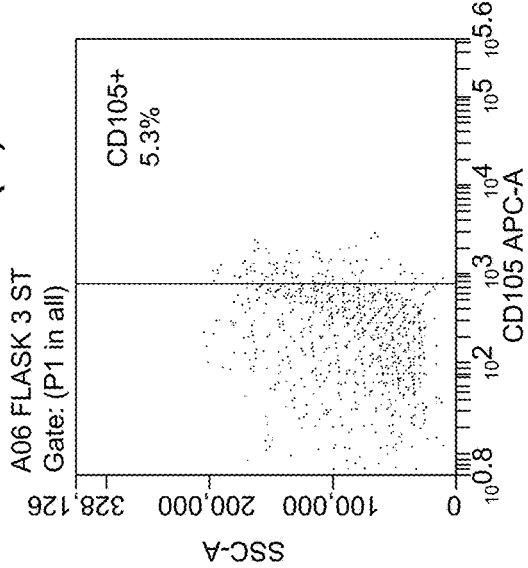
Figure 5I:
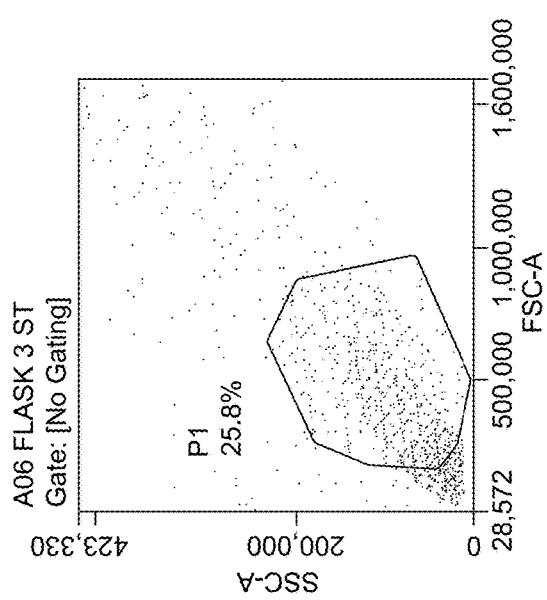
Figure 5K:
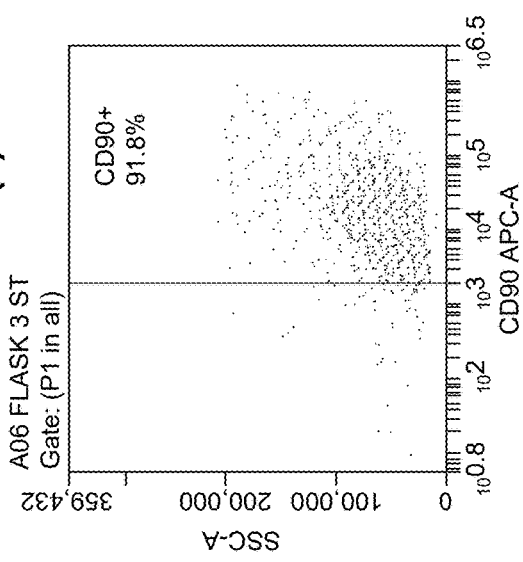

At the same seeding density (seeding was performed without considering the cell viability after storage) after 10 days of culturing cells in "Custodiol-CE" flasks only individual fibroblast-like cells with clear morphological signs of their destruction were observed (FIG. 4(A)), whereas in the "Custodial-QTM" flasks the progressive growth of MSCs with normal morphology reached a confluence of 80-90% (FIG. 4(B)).

Since practically all cells in "Custodiol-CE" flasks were destroyed on the tenth day of cultivation after storage for three weeks at 4° C. and one week at room temperature (25±2° C.), therefore phenotyping was impossible. Phenotyping of MSCs after storage under similar conditions, but in Custodial QTM solution, showed (FIGS. 5(A) through 5(L)) the expression of CD73 positive by 89.7-93.5% of cells; CD90 positive by 91.8-93.4%; CD105-positive by 5.2-10.2% of cells were found, which are typical feature for MSC isolated from the tissues of the abortive placenta.

Thus, the addition of the QTM composition (20 µM quercetin, 150 µM taurine hydrochloride and 40 µM Mildronate) to Custodiol-CE effectively protects fetal placental MSCs from damage during storage of their cell suspensions for three weeks at 4° C. and one week at room temperature (25±2° C.), which makes it possible to characterize cells, control their biological safety and transport them to the patient's treatment site/clinical trials without the use of cytotoxic cryoprotectants and deep freezing in liquid nitrogen.

Cryoprotective agents (CPAs) are used to eliminate ice formation when cooling organs, tissues or cells to cryogenic temperatures for long-term storage. Organs could be cryopreserved without ice formation if there were no limit to the amount of CPA that could be used, but toxicity of CPAs limits the amount that can be used. CPA toxicity has been described as the major impediment to cryopreservation by vitrification. Many, if not most, cryopreservation researchers seem to have the view that CPA toxicity follows different rules for different cells, tissues, or organisms. CPAs may be deemed toxic if cell membranes are breached or damaged, if enzyme function is impaired, if cell or embryo development is diminished, if sperm motility is impaired, if mitochondrial function is reduced, or if DNA, protein, or other macromolecules are damaged.

Toxicity can be specific to a particular CPA (specific toxicity) or toxicity that is a consequence of being a CPA (non-specific toxicity). CPAs are believed to prevent ice formation by interfering with hydrogen bonding between water molecules, and this effect has been proposed to cause non-specific toxicity.

Penetrating CPAs, namely, ethylene glycol (EG), propylene glycol (PG; 1,2-propanediol), dimethylsulfoxide (DMSO), glycerol (GLY), formamide (FMD), methanol (METH), and butanediol (BD; 2,3-butanediol).

EG is metabolized (primarily in the liver) by alcohol dehydrogenase to glycoaldehyde and then by aldehyde dehydrogenase to produce glycolic acid, which can result in metabolic acidosis. Glycolic acid can be further metabolized to oxalic acid, which precipitates with calcium to form calcium oxalate crystals in many tissues, notably the kidney. Metabolism of EG to an extent that elicits clinically significant symptoms can take hours at body temperature. Because of the time required and because metabolism is mainly in the liver, this form of toxicity is probably not relevant to rapid hypothermic procedures used to cryopreserve organs, tissues, and cells. Independent of the effects of calcium oxalate, EG can cause gastrointestinal irritation and pulmonary edema as well as widespread inflammation of the lungs.

PG has few systemic toxic effects as evidenced by the fact that it has been safely used in many food products. PG has been used as an antidote for EG poisoning. Nonetheless, PG often exhibits toxicity when used as a CPA. For example, PG in excess of 2.5 M has been shown to impair the developmental potential of mouse zygotes by decreasing intracellular pH.

Cryopreservation of spermatozoa by GLY was a major breakthrough for cryobiology. Nonetheless, some injuries are evident. Systemically, 10 mL of 50% GLY per kilogram induces renal failure in rats through inflammation, oxidative stress, and apoptosis. All of these processes are facilitated by caspases. GLY depletes reduced glutathione in the kidney, leading to oxidative stress. In stallion spermatozoa, GLY in concentrations over 1.5% polymerizes the actin cytoskeleton, a phenomenon unrelated to osmolality. Freezing human sperm with 15% GLY is equally likely to damage sperm morphology, mitochondria, and viability, but reduction in motility was shown to correlate with reduction in mitochondrial function. GLY is reportedly much more toxic than other CPAs for flounder embryos and *Escherichia coli* bacteria.

FMD is a highly corrosive amide that has been used for manufacturing plastics. Inhalation of large amounts of FMD can require medical attention due to kidney and blood cell injury, although the molecular mechanisms have not been carefully studied. As with water, FMD molecules can form four intermolecular hydrogen bonds, and therefore pure FMD solution will form networks as water does. The dipole moment of the FMD molecule is roughly twice that of a water molecule. FMD hydrogen bonding to water is about 10-20% stronger than hydrogen bonding between water molecules. Mixed with water, FMD molecules more strongly self-associate than associate with water molecules, which may explain why FMD cannot vitrify in an aqueous solution without assistance from other CPAs. A FMD molecule hydrogen-bonds to another FMD molecule with a strength of −5.51 kcal/mol, but a chain of 12 FMD molecules can reach hydrogen-bonding strength of −13.66 kcal/mol. These hydrogen-bonding strengths are greater than the hydrogen bond strength between water molecules (−4.46 kcal/mol). FMD can denature DNA, an effect believed to be due to displacement of hydrating water.

METH is metabolized to formaldehyde and then to formic acid by alcohol dehydrogenase, which can cause metabolic acidosis, cardiovascular instability, and blindness by destruction of the optic nerve. In zebrafish ovarian follicles, cryopreservation with METH showed a dose-dependent reduction in five mitochondrial function measures-membrane potential, mitochondrial distribution, mitochondrial DNA copy number, adenosine triphosphate (ATP) levels, and adenosine diphosphate (ADP/ATP ratios. A study of fish oocytes found that methanol concentrations above 6 M (but not below) resulted in protein damage or proteolysis.

Butanediol has four stable structural isomers, only two of which (1,3-butanediol and 2,3-butanediol, i.e., BD) have been used as CPAs. The CPA properties of 1,3-butanediol are reportedly similar to those of PG, while being slightly more toxic than PG for erythrocytes and considerably more toxic than PG for mouse blastocysts. A 20% vol/vol solution of 1,3-butanediol is less toxic than BD for mouse blastocysts.

There is a dose-dependent reduction in rat heart rate for DMSO concentrations above 0.14 M (1% vol/vol). Irreversible ultrastructural alterations to rat myocardium occur above 1.41 M (10% vol/vol) DMSO at 30° C., and above 2.82 M DMSO at 15° C. Another study showed an increase in action potential duration associated with myocardial cell shrinkage for guinea pig heart muscle exposed to 10% DMSO for 30 min at room temperature. Aside from osmotic effects, direct blocking action on membrane channel proteins by DMSO molecules is a suggested explanation.

Dermal fibroblasts exposed to DMSO in increasing concentrations between 5% to 30% (vol/vol) at 4° C., 25° C., and 37° C. for periods of 10, 20, and 30 min showed decreasing viability with increasing concentration, temperature, and exposure time. Increasing DMSO concentration from 7.5% to 10% reduces the clonogenic potential of peripheral blood progenitor cells. Hamster fibroblasts exposed for 1 hr to 10% DMSO at 37° C. showed undulations in the cell membrane without swelling, 20% DMSO caused water entry and swelling, and 30% DMSO caused plasma membrane blebs that indicate dissociation between the plasma membrane and the cytoskeleton. Chondrocytes showed decreasing recovery for increasing temperature (4° C., 22° C., 37° C.) and for increasing DMSO concentration (7.5%, 22%, 37%, 44%) for increasing time between 0.5 min and 120 min.

At 20° C. DMSO increasingly binds to proteins at concentrations above 40%, which can lead to protein unfolding. Considerable irreversible binding of DMSO to protein has been observed at 10° C. DMSO has been shown to react with both eye lens protein and glutathione.

DMSO protects rat hepatocytes from apoptosis at 1% concentration by shifting caspase-9 into the nucleus (where it cannot initiate apoptosis). In cultured juvenile rat hippocampal cells, DMSO caused apoptosis in a dose-dependent fashion between 0.5% and 1.0% concentration. In lymphoma cell lines, DMSO has an anti-apoptotic effect in the concentration range between 1% and 2% over 4-6 days, but DMSO becomes pro-apoptotic at higher concentrations. Ames testing of bacteria with 33% DMSO for 10 min showed a 10-fold increase in mutagenicity.

Rat pup cochlear cells showed a dose-dependent increase in apoptosis when exposed to DMSO concentrations between 0.5% and 6% for 24 hr. Rat retina cells exposed to DMSO concentrations as low as 0.1% vol/vol for 24 hr exhibited apoptosis. The DMSO inhibited mitochondrial respiration and elevated cystolic calcium. For several cell types, including fibroblasts, 1% DMSO increased intracellular calcium two- to six-fold within 5 sec. Increased intracellular calcium can lead to apoptosis. DMSO can increase osteoclast cell surface area when not used in high concentrations (high concentration induces osteoclast apoptosis).

Individually, GLY, DMSO, PG, and BD caused corneal endothelial cell loss after exposure for 10-15 min at 0-4° C. at concentrations insufficient to vitrify.

Cell membrane toxicity is a particular kind of specific toxicity, most frequently associated with DMSO.

When used intravenously, DMSO has been shown to cause hemolysis.

DMSO, METH, GLY, and EG all have antioxidant capability, with DMSO being the most potent and GLY the least. But DMSO can be a pro-oxidant by oxidizing free thiol groups on proteins (affecting protein function).

Plant Vitrification Solution 2 (PVS2) contains 30% GLY, 15% EG, and 15% DMSO. Shoot tips treated with PVS2 showed lipid peroxidation that could be reduced with melatonin or vitamins C and E. Membrane lipid peroxidation in seedlings treated with PVS2 was reduced by glutathione and ascorbic acid.

Cryopreservation of pig ovaries with a vitrification solution containing EG produced oxidative damage that was reduced by anti-oxidant treatment. Anti-oxidants have been shown to reduce the toxic effects of kidney epithelial cells exposed to oxalate and calcium oxalate. N-acetylcysteine has been shown to reduce glycerol-induced oxidative stress in the kidney. CPAs with low permeability can cause more osmotic stress than CPAs with high permeability. Membrane permeabilities of a variety of non-electrolytes, including CPAs, have been studied on a number of cell types, including human blood cells.

For a variety of cell types, DMSO has many times the membrane permeability of GLY. EG has about half the permeability of PG or DMSO for human oocytes (and thus increased membrane damage from osmotic stress), but EG is the preferred CPA because it is less toxic. For pig oocytes, cryopreservation with PG resulted in higher survival than with EG due to greater permeability (and less osmotic membrane damage); but developmental competence of oocytes that survived cryopreservation was greater for EG, suggesting that PG is more toxic. Human sperm cryopreserved with 1 M EG showed more viability than sperm cryopreserved with 1 M GLY, reportedly because EG is four times more membrane permeable and thus causes less osmotic damage. However, 2 M EG did not result in better motility than 1 M GLY, possibly due to EG toxicity. For flounder embryos, EG causes much less osmotic stress than METH, but is much more toxic. Using survival to hatching as the toxicity assay for flounder embryos exposed to CPAs for 60 min at −15° C. resulted in the following order of CPA toxicities, with EG being the most toxic: EG>glycerol>DMSO>METH>PG. But combining 20% METH with 5% of any of the other CPAs resulted in much less toxicity than combining 20% PG, EG, or DMSO with 5% of any of the other CPAs (except METH).

Osmotic damage is often associated with cryopreservation of other cells or tissues. Excessive osmotic stress can interfere with protein structure and reduce enzyme activity while causing DNA damage and apoptotic cell death.

Vascular endothelial cells exposed to BD, PG, DMSO, and EG at their vitrifying concentrations at 2-4° C. for 9 min showed significantly higher survival for BD or PG than for DMSO or EG. Permeability is highest for BD (4.1), followed by PG (3.0), and then DMSO (2.4) and EG (2.0) (all units in cm/sec×$10^{-6}$). Raising the temperature from 2-4° C. to 22° C. increased the permeability 17-fold for BD and DMSO, but only 13-fold for PD and nine-fold for EG. BD is much more toxic than PD at equivalent concentrations, but at the concentrations required to vitrify (32% wt/wt for BD and 45% wt/wt for PG) BD was reportedly less toxic. Cold shock most immediately impacts membrane-bound lipids, protein conformation, and nucleic acid conformation. Cold shock inhibits mRNA translation, cold-shock proteins are induced, and there is increased synthesis of more unsaturated fatty acids to increase membrane fluidity. Initial mRNA translation appears to be the key control point for the cold-shock response in mammalian cells, and oxidative damage can be involved. Membrane-bound enzyme activity is inhibited, and diffusion rates are reduced. Cold shock proteins may recruit mRNA and ribosomes to the cytoskeleton for translation.

One mechanism of chilling injury in animal cells is probably due to phase transitions in cell membranes. Lipids in cell membranes would be expected to undergo a liquid-to-gel phase transition in a range between 0° C. and 20° C., the temperature range of maximum chilling injury. Chilling sensitivity has been reduced in plants by introducing double bonds into the fatty acids of cell membranes though genetic manipulation and in sheep oocytes by feeding unsaturated fatty acids to ewes. Platelets are exceptionally vulnerable to chilling injury and have served as models for cold-induced dysfunction.

Chilling injury increases with exposure time at critical temperatures and, in fact, rapid cooling through the critical temperature range can be a means to reduce chilling injury. Fish embryos, which are vulnerable to both chilling sensitivity and cold shock, cannot be cryopreserved by such rapid cooling. Methanol protects zebrafish embryos from chilling injury, a benefit speculated to be due to possible depression of phase transition temperatures in the lipid membranes. Microtubule polymerization in oocytes is very temperature sensitive, and complete microtubule de-polymerization can occur just above 0° C. In some cases, re-polymerization of the meiotic spindle occurs on rewarming, but in other cases irregular chromosomal configurations and abnormal tubulin organization remain after rewarming.

Although chilling sensitivity has been reduced in plants by increasing the degree of fatty acid unsaturation, much of the chilling injury (or cold shock) in plants has been attributed to free radical damage. Evidence for free radical damage during chilling has also been seen in houseflies and sperm (sperm membranes have a high polyunsaturated fatty acid content).

Chinese hamster ovary cell lines were assayed for chromosome damage after exposure to DMSO, PG, and EG. No chromosome damage was seen for DMSO or EG, but substantial chromosome damage was seen for PG. When a cytochrome P450 oxidation system was added, EG, but not DMSO, showed substantial chromosome damage. Cytochrome 450 has been shown to metabolize EG to formaldehyde in rats. In mouse oocyte cryopreservation mixtures, PG caused significant DNA fragmentation, whereas EG and DMSO did not; 99% DMSO, FMD, or METH dissolves DNA.

A study of mouse oocytes comparing EG with DMSO found that both CPAs increased intracellular calcium, but only for DMSO was there an intracellular calcium source. A different study comparing CPAs for mouse oocyte cryopreservation, PG, DMSO, and EG all increased intracellular calcium content, with PG increasing calcium the most, and EG increasing calcium the least. The source of the calcium for PG and EG was extracellular, whereas for the DMSO the source was intracellular.

DMSO, PG, and GLY all showed increasing formaldehyde concentrations as a function of increasing molarity in mouse oocytes, but the formaldehyde increase for PG was more than 30-fold greater than for DMSO or GLY. Removal of the formaldehyde reduced the zona pellucida hardening. Although the mechanism of formaldehyde production is unknown, it may be due to a non-enzymatic reaction in the CPA and solvent.

The minimum concentrations of CPAs that resulted in significant reduction of mouse morula survival with 5 min of 25° C. exposure was EG (7 M), GLY (6 M), DMSO (5 M), and PG (4 M). METH was the second least toxic CPA after EG, showing reduced mouse morula survival after 10 min of 6 M exposure. For mouse blastocysts exposed to 30% vol/vol CPAs for 10 min at room temperature, EG was by far the least toxic (74.6% of blastocysts subsequently developed) compared to DMSO (25.0%), GLY (21.9%), BD (8.7%), PG (2.1%), or 1,3-butanediol (1.7%). For mouse blastocysts exposed to 20% vol/vol CPAs for 40 min at room temperature, DMSO was the least toxic (96.7% survived), followed by EG (95.8%), PG (87.5%), GLY (81.7%), 1,3-butanediol (64.2%), and BD (8.3%).

For mouse beta cells, DMSO was found to be more toxic than PG for a range of concentrations and a range of temperatures above 0° C. On the basis of tests of two cell types, CPA toxicity may be greater for cells with higher metabolic activity. The toxicities of EG and DMSO for endothelial cells were much greater than the toxicities of PD and BD. Reducing BD concentration from 3.0 M to 2.0 M cut endothelial cell loss by a factor of 35, whereas the same molar reduction of DMSO only cut endothelial cell loss by a factor of 3.

BD was determined to be less toxic to vascular endothelial cells than DMSO, PG, or EG. Moreover, the exposure of vascular endothelial cells to vitrifying concentrations of BD (2,3 butanediol) (32%), PG (45%), DMSO (45%), and EG (45%) at 2-4° C. for 9 min resulted in the greatest cell survival with BD and the least survival with EG. Quantitatively these rates were BD (76.3% survival), PG (63.6%), DMSO (37.0%), and EG (33.2%), but the concentrations needed to vitrify were 32% for BD and 45% for DMSO, EG, and PG.

If CPA toxicity during organ, tissue, or cell cryopreservation causes caspases, proteases, or kinases to be released, leading to apoptosis, interventions could be applied to reverse these processes. Caspase inhibitors have been used to block apoptosis in cryopreserved hematopoietic cells rewarmed from cryogenic temperatures. Lesser forms of CPA toxicity might be reversed by epigenetic modifications. Gene expression changes associated with chilling injury have been assayed, and those changes could have been due to epigenetics. Computer-based systems of drug discovery that alter metabolism to a healthy state have been validated, and such systems might be applied to metabolic dysfunction induced by CPAs.

Attempts to explain CPA toxicity are urgent and laudable. CPA toxicity should be understood if it is to be reduced by means other than trial and error. To understand CPA toxicity, it is necessary to understand what macromolecules or organelles are being chemically damaged and how they are being damaged. Various cells or tissues should be exposed to various CPAs followed by examination of those cells or tissues for damage to DNA, proteins, mitochondria, etc. Then, an effort should be made to determine the molecular mechanisms that caused the damage. If individual CPAs can neutralize other individual CPAs, the mechanism of this neutralization should be determined. If dehydration damage is the mechanism of non-specific CPA toxicity, this needs to be demonstrated. Electron microscopy could potentially supplement macromolecule and organelle damage assays.

Thus, the search for ways to reduce the cytotoxicity of cryoprotectants continues. Therefore, the search for possibilities for storing cells without using cryoprotectants, at least for short periods, remains relevant. For example, U.S. Pat. No. 9,265,795 issued to Hope et al. on Feb. 23, 2016, suggests using a composition comprising: (i) Trolox, Na+, K+, Ca2+, Mg2+, Cl−, H2PO4−, HEPES, lactobionate, sucrose, mannitol, glucose, dextran-40, adenosine, glutathione; and (ii) stem cells or progenitor cells where the composition does not comprise a dipolar aprotic solvent in particular DMSO. In the embodiments herein, quercetin, taurine hydrochloride, and mildronate are used to reduce the cytotoxic effects of heat shock and oxygen deficiency.

Quercetin is a flavonoid compound found widely in plants and exhibiting various biological activities. Research on quercetin has shown its potential for medicinal use. There is an antioxidant component of quercetin as well as broad-spectrum antibacterial and antiparasitic properties, and thus has potential applications in anti-cancer, cardiovascular protection and treatment of anti-immunosuppressive drugs, and may reduce mycotoxin toxicity.

Quercetin is widely found in plants in nature, including apples, berries, *brassica* vegetables, capers, grapes, onions, spring onions, tea, and tomatoes, as well as in many seeds, nuts, flowers, bark, and leaves. However, quercetin is also contained in medicinal plants, including *Ginkgo biloba*, *Hypericum* perforatum, and elderberry, and is mainly derived from onions, apples, and tea. Its molecular formula is C15H10O7, and the chemical structural formula:

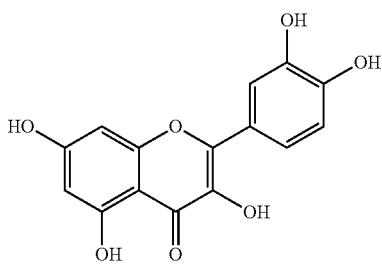 [SMILES: O=c1c(O)c(-c2ccc(O)c(O)c2)oc2cc(O)cc(O)c12]

The antioxidant mechanisms of quercetin in vitro mainly include the following: (1) Directly scavenging free radicals. Quercetin adulterated with liposomes and glycerol nanoparticles could scavenge free radicals and protect human keratinocytes from hydrogen peroxide damage in vitro. (2) Chelating metal ions. Quercetin can induce $Cu^{2+}$ and $Fe^{2+}$ to play an antioxidant role through catechol in its structure. Quercetin could inhibit $Fe^{2+}$-induced lipid peroxidation by binding $Fe^{2+}$ and finally inhibit iron overload and oxidative damage in alcoholic liver disease. Furthermore, $Fe^{2+}$ in compounds containing dihydroquercetin is inactive, unable to catalyse the decomposition of hydrogen peroxide, and unable to trigger further generation of hydroxyl free radicals. Therefore, quercetin can play the role of antioxidant stress through various cohorts and $Fe^{2+}$. (3) Inhibiting lipid peroxidation. Quercetin could inhibit the oxidative modification of low-density lipoprotein, which can be determined by observing the changes in the fluorescence intensity of thiobarbital, phosphatidylcholine hydroperoxides, and oxidized low-density lipoprotein, thus inhibiting the oxidative damage of LDL. At low concentrations, quercetin can increase the expression of LDL-R, reduce the secretion of PCSK9, stimulate the uptake of LDL, and thus inhibit LDL oxidative damage.

Quercetin alleviates mycotoxins by protecting cells from endoplasmic reticulum stress and apoptosis induced by mycotoxins, increasing the level of glutathione peroxidase, enhancing the activity of oxide dismutase, increasing the activity of catalase, reducing the lipid peroxidation reaction, and decreasing the level of ROS. The antioxidant activity of quercetin and saffron can decrease the level of ROS produced by ZEN, inhibit ER stress, and protect HCT116 and HEK293 cells from ZEN-induced apoptosis. Quercetin could prevent a/b-ZOL-induced ROS generation in HCT116, prevent a-ZOL and b-ZOL-induced ER stress, and reduce a-ZOL and b-ZOL-induced apoptosis. Quercetin protects HCT116 cells from a-ZOL and b-ZOL-induced apoptotic cell death.

In addition, quercetin also shows antigenic toxicity potential by reducing DNA damage and micronucleus (MN) damage induced by the *Aspergillus* toxin. Quercetin pretreatment can inhibit ochratoxin-induced cytotoxicity and oxidative stress. The contents of NO, TNF-α, IL-6, and IL-8 of ochratoxin have been found to be significantly reduced in samples pretreated with quercetin, indicating that quercetin had anti-inflammatory effects. It has been proved that quercetin has a cytoprotective effect on ochratoxin-induced oxidative stress, genotoxicity, and lymphocyte inflammation.

Quercetin has shown good therapeutic activities against various diseases. Through continuous research, quercetin is expected to become a new drug that can prevent and treat various diseases. Its powerful antioxidant, anti-inflammatory, and antitumour effects have great prospects in clinical application.

Some prior studies have investigated the protective effects of quercetin on the ARPE 19 human retinal pigment epithelial cell line. ARPE 19 cells were pretreated with various concentrations of quercetin (0.80 μM) before exposure to 300 μM $H_2O_2$. Cell viability was assessed, and reactive oxygen species (ROS) were determined. The importance of the NF E2 related factor 2 (Nrf2) signaling pathway was corroborated by western blotting and immunostaining. The protein expression levels of endoplasmic reticulum associated stress responsive genes and apoptotic markers were assessed by western blotting. The results demonstrated that in the $H_2O_2$ group, cell viability was weakened, but preserved in quercetin group in a dose dependent manner, particularly at 20 μM. The level of ROS decreased in the quercetin group compared with the control groups. In the quercetin group, the expression levels of Nrf2 and phase II enzymes (NQO1 and HO 1) were increased, whereas the levels of ER stress markers (binding of immunoglobulin protein, CCAAT/enhancer binding protein homologous protein and phosphorylated eukaryotic translation initiation factor 2a) were reduced. Cell apoptosis associated protein expression levels were altered, with the increase of B cell lymphoma 2 and reduction of Bcl 2 X associated protein. Accordingly, quercetin protected ARPE 19 cells from $H_2O_2$ induced cytotoxicity by activating the Nrf2 pathway, inhibiting ER stress and targeting anti apoptotic proteins.

Taurine is a nonessential amino acid that has received much attention. Its molecular formula is C2H7NO3S. Its chemical structure is:

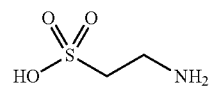

Two organs, the heart and the brain, are known to produce their own taurine, but in very limited quantities. In humans, taurine can be found at high concentrations in the plasma (near 50-150 mol/L), bile, and saliva as well as being very abundant in heart tissue (6 mol/L). The plasma concentration of taurine is known to decrease during human development and aging.

Intracellular taurine concentration is known to be very stable unless there is an osmotic, chemical, or mechanical insult to the cell that decreases the content of the cell by the release of taurine to reestablish the osmotic equilibrium.

The beneficial effects of taurine have been demonstrated in many diseases such as decreased serum low-density lipoprotein, decreased progression of atherosclerosis, and protection against ischemia-reperfusion injury of the myocardium. Besides, the beneficial effects of taurine in diabetic cardiovascular complications are well documented. It has been suggested that taurine increases the high-energy phosphate content of the heart.

Most of the beneficial effects of taurine on cardiovascular diseases, particularly cardiac hypertrophy, were suggested to be due to its action on reactive oxygen species (ROS) as well as on intracellular $Na^+$ and $Ca^{2+}$ overloads. Indeed, taurine is co-transported with $Na^+$ within the cell via a unidirectional membrane transporter, which directly leads to an intracellular $Na^+$ overload and indirectly promotes an intracellular $Ca^{2+}$ overload via the stimulation of the $Na^+/Ca^{2+}$ exchanger.

The increase in intracellular $Ca^{2+}$ and $Na^+$ by short-term treatment with taurine was mainly at the nuclear levels. Curiously, contrary to short-term treatment, long-term treatment with taurine decreased intracellular Na+ and Ca2+. Furthermore, contrary to short-term treatment, the decrease of total intracellular Na+ and Ca2+ was mainly at the cytosolic level. The increase or decrease of intracellular Na+ and Ca2+ respectively by short- and long-term exposure to taurine was suggested to be due to modulation of the minimum Na+ and Ca2+ buffering capacity of the nucleus as well as, at least in part, to the stimulation of Ca2+ efflux via the calcium pump.

All of the literature in the field of taurine agrees that one of the most important beneficial effects of taurine is its antioxidant property. However, most of these studies did not show a direct effect of taurine on oxidants. For example, taurine was shown to be unable to directly chelate certain ROS molecules such as superoxide anions. They mostly attributed to taurine a function as an anti-oxidant but not as an anti-oxidant per se. The anti-oxidant-like effect of taurine was reported in many cell types and in many conditions that induce oxidative stress. These antioxidant-like effects of taurine were mainly attributed to its mitochondrial protective effect, thus preventing mitochondrial ROS generation.

Taurine deficiency-mediated impairment of complex I activity also affects energy metabolism, largely through elevations in the NADH/NAD+ ratio, which regulate energy metabolism by feedback inhibiting key dehydrogenases. The citric acid cycle is very sensitive to increases in the NADH/NAD+ ratio, as three NADH sensitive enzymes (α-ketoglutarate dehydrogenase, isocitrate dehydrogenase and citrate synthase) are subject to inhibition by elevations in the NADH/NAD+ ratio. For example, oxidation of pyruvate by the taurine deficient heart falls, as elevations in the NADH/NAD+ ratio inhibits pyruvate dehydrogenase activity and causes a deficiency in pyruvate, arising from the massive conversion of pyruvate to lactate. Thus, despite stimulation of glycolysis, glucose oxidation is significantly reduced in the taurine deficient heart, dramatically decreasing the contribution of glucose metabolism toward overall ATP biosynthesis. The rate of taurine biosynthesis by the liver is low in humans, therefore, the major source of taurine in humans is the diet. For many years, diets rich in seafood were considered an excellent source of taurine, with meat containing some but less taurine than seafood. However, the recent introduction of taurine-containing supplements provides an alternative source of taurine. The supplements have proven to be effective therapeutic agents, at least in the case of heart failure. Additionally, taurine is deficient in hearts of patients suffering from heart failure. Restoration of taurine levels in these patients through supplementation leads to improved contractile function. As such, taurine supplements are important therapeutic agents. However, the largest decline in energy metabolism occurs in fatty acid oxidation, which falls in part because of a decrease in citric acid cycle flux. Also suppressing fatty acid oxidation in taurine deficiency are the low levels of the transcription factor, PPARα.

Taurine treatment triggers genetic changes. Moreover, several taurine sensitive genes contribute to a wide range of cellular functions (e.g., cell cycle progression, cell signaling, death and survival, amino acid metabolism, protein biosynthesis, protein folding and aging). Taurine-mediated changes in transcription factor content have also been reported. Although taurine is known to modulate protein phosphorylation and cell signaling, it remains to be determined if alterations in protein phosphorylation are involved in taurine-mediated genetic changes.

Another important mechanism of taurine cytoprotection is attenuation of endoplasmic reticular (ER) stress. ER stress is an important regulatory mechanism designed to restore ER function and re-establish a balance between protein degradation and protein biosynthesis/folding. When a cell experiences excessive ER stress, pathways are stimulated that can kill the cell. A common initiator of ER stress is the accumulation of defective proteins, whose levels increase as a result of improper protein folding, inadequate protein degradation or ER dysfunction. To restore ER function and the balance between protein degradation and protein biosynthesis/folding, unfolded or misfolded proteins activate three stress sensors (PERK, ATF6 and IRE1) that initiate distinct pathways known as the unfolded protein response (UPR) pathways. Together, the UPR pathways are capable of suppressing protein biosynthesis, enhancing protein degradation, generating chaperones to improve protein folding and initiating either autophagy or apoptosis. During a stroke, taurine decreases glutamate toxicity, thereby reducing both oxidative stress and calcium overload. However, taurine also suppresses two of the three UPR pathways. Although the mechanisms underlying the actions of taurine against ER stress and the UPR pathways remain to be determined, it is relevant that taurine deficiency is associated with ER stress. It has been proposed that taurine might alter protein folding, either by reducing oxidative stress or providing a better osmotic environment for protein folding.

Taurine also regulates quality control processes, such as the ubiquitin-proteasome system and autophagy. These processes either rejuvenate damaged cells and subcellular organelles or eliminate them through degradation or cell death. In taurine deficient cells, a reduction in the activity of the proteasome leads to an accumulation of ubiquitinated proteins, an effect abolished by the mitochondrial specific antioxidant, mitoTEMPO. Taurine deficiency is also associated with diminished autophagy, a condition that allows damaged cells and organelles to accumulate. Inactivation of these quality control processes is extremely damaging to cells and tissue. However, excessive autophagy is also damaging because it can elevate cell death. Although there have only been a few studies examining the effect of taurine treatment on autophagy, the actions of taurine are compatible with its cytoprotective activity, as taurine attenuates toxin-mediated autophagy.

Mildronate (3-(2,2,2-trimethylhydrazinium) propionate; MET-88; meldonium, quaterine) C6H14N2O2·2H2O is an antiischemic drug developed at the Latvian Institute of Organic Synthesis. Mildronate was designed to inhibit carnitine biosynthesis in order to prevent accumulation of cytotoxic intermediate products of fatty acid beta-oxidation in ischemic tissues and to block this highly oxygen-consuming process. Mildronate propionate's chemical structure is:

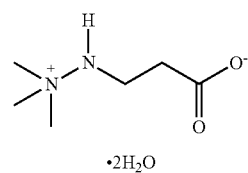

·2H$_2$O

To ensure a continuous guarantee of energy supply, the body oxidizes considerable amounts of fat along with glucose. Carnitine transports activate long-chain fatty acids (FA) from the cytosol of the cell into the mitochondrion and is therefore essential for fatty acid oxidation (known as beta oxidation). Carnitine is mainly absorbed from the diet but can be formed through biosynthesis. To produce carnitine, lysine residues are methylated to trimethyllysine. Four enzymes are involved in the conversion of trimethyllysine and its intermediate forms into the final product of carnitine. The last of these 4 enzymes is gamma-butyrobetaine dioxygenase (GBB), which hydroxylates butyrobetaine into carnitine. The main cardioprotective effects are mediated by the inhibition of the enzyme GBB. By subsequently inhibiting carnitine biosynthesis, fatty acid transport is reduced and the accumulation of cytotoxic intermediate products of fatty acid beta-oxidation in ischemic tissues to produce energy is prevented, therefore blocking this highly oxygen-consuming process. Treatment with meldonium therefore shifts the myocardial energy metabolism from fatty acid oxidation to the more favorable oxidation of glucose, or glycolysis, under ischemic conditions. It also reduces the formation of trimethylamine N-oxide (TMAO), a product of carnitine breakdown and implicated in the pathogenesis of atherosclerosis and congestive heart failure.

In fatty acid (FA) metabolism, long chain fatty acids in the cytosol cannot cross the mitochondrial membrane because they are negatively charged. The process in which they move into the mitochondria is called the carnitine shuttle. Long chain FA are first activated via esterification with coenzyme A to produce a fatty acid-coA complex which can then cross the external mitochondrial border. The co-A is then exchanged with carnitine (via the enzyme carnitine palmitoyltransferase I) to produce a fatty acid-carnitine complex. This complex is then transported through the inner mitochondrial membrane via a transporter protein called carnitine-acylcarnitine translocase. Once inside, carnitine is liberated (catalyzed by the enzyme carnitine palmitoyltransferase II) and transported back outside so the process can occur again. Acylcarnitines like palmitoylcarnitine are produced as intermediate products of the carnitine shuttle. In the mitochondria, the effects of the carnitine shuttle are reduced by meldonium, which competitively inhibits the SLC22A5 transporter. This results in reduced transportation and metabolism of long-chain fatty acids in the mitochondria (this burden is shifted more to peroxisomes). The final effect is a decreased risk of mitochondrial injury from fatty acid oxidation and a reduction of the production of acylcarnitines, which has been implicated in the development of insulin resistance. Because of its inhibitory effects on L-carnitine biosynthesis and its subsequent glycolytic effects as well as reduced acylcarnitine production, meldonium has been indicated for use in diabetic patients.

Meldonium is believed to continually train the heart pharmacologically, even without physical activity, inducing preparation of cellular metabolism and membrane structures, specifically in mitochondria to survive ischemic stress conditions. This is done by adapting myocardial cells to lower fatty acid inflow and by activating glycolysis; the heart eventually begins using glycolysis instead of beta oxidation during real life ischaemic conditions. This reduces oxidative stress on cells, formation of cytotoxic products of fatty acid oxidation and subsequent cellular damage. This has made meldonium a possible pharmacological agent for ischemic preconditioning.

Meldonium ameliorates I/R-induced liver inflammation and injury, as confirmed by liver histology, and by attenuation of serum alanine- and aspartate aminotransferase activity, serum and liver high mobility group box 1 protein expression, and liver expression of Bax/Bcl2, haptoglobin, and the phosphorylated nuclear factor kappa-light-chain-enhancer of activated B cells. Through the increased hepatic activation of the nuclear factor erythroid 2-related factor 2, meldonium improves the antioxidative defense in the liver of animals subjected to I/R, as proved by an increase in serum and liver ascorbic/dehydroascorbic acid ratio, hepatic haem oxygenase 1 expression, glutathione and free thiol groups content, and hepatic copper-zinc superoxide dismutase, manganese superoxide dismutase, catalase, glutathione peroxidase, and glutathione reductase activity.

The embodiments herein use the complex cytoprotective effects of quercetin, taurine hydrochloride, and mildronate to protect stem/progenitor cells during short-term (4 weeks: 3 weeks at 4° C.+1 week at 25±2° C.) storage without deep freezing.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An ex vivo suspension of fetal placental mesenchymal stem cells (MSCs), comprising-fetal placental MSCs that express CD73, CD90, and CD105, and a cytoprotective composition,
wherein the cytoprotective composition comprises sodium chloride, potassium chloride, potassium dihydrogen phosphate, potassium a-ketoglutarate, magnesium chloride hexahydrate, histidine-monohydrochloride monohydrate, histidine, tryptophan, mannitol, calcium chloride dihydrate, 3-(2,2,2-trimethylhydrazinium) propionate, quercetin, and taurine;
and wherein the cytoprotective composition preserves the viability and proliferation ability of the fetal placental MSCs for three weeks at 4° C. and one week at room temperature 25° C., and
wherein the ex vivo cell suspension is free of cryoprotectants.

2. The ex vivo cell suspension according to claim 1, wherein the cytoprotective composition comprises: 18.0 millimole of the sodium chloride, 15 millimole of the potassium chloride, 1.0 millimole of the potassium a-ketoglutarate, 4.0 millimole of the magnesium chloride hexahydrate, 18.0 millimole of the histidine-monohydrochloride monohydrate, 198 millimole of the histidine, 2.0 millimole of the tryptophan, 30.0 millimole of the mannitol, 0.015 millimole of the calcium chloride dihydrate, 40.0 micromole of the 3-(2,2,2-trimethylhydrazinium) propionate, 20.0 micromole of the quercetin, and 150.0 micromole of the taurine; with a pH of 7.2, and an osmolality of 310 milliosmol/kg.

3. The ex vivo cell suspension according to claim 1, wherein the fetal placental MSCs comprises expression of CD73 at 93.5%, expression of CD90 at 93.4%, expression of CD105 at 10.2% after three weeks at 4° C. and one week at 25° C.

4. The ex vivo cell suspension according to claim 1, wherein the cryoprotectants include both permeable and non-permeable cryoprotectants.

5. The ex vivo cell suspension according to claim 1, wherein the fetal placental MSCs are adapted for regenerative medicine, which includes the treatment of damaged tissues and organs.

\* \* \* \* \*

UNITED STATES PATENT AND TRADEMARK OFFICE
CERTIFICATE OF CORRECTION

PATENT NO. : 12,471,592 B2  
APPLICATION NO. : 17/405735  
DATED : November 18, 2025  
INVENTOR(S) : Abhijit Bopardikar et al.

Page 1 of 1

It is certified that error appears in the above-identified patent and that said Letters Patent is hereby corrected as shown below:

On the Title Page

(72) Inventors: insert --Zara Namjoshi--

Signed and Sealed this  
Twenty-third Day of December, 2025

John A. Squires  
*Director of the United States Patent and Trademark Office*